US012155600B2

(12) United States Patent
Liu et al.

(10) Patent No.: US 12,155,600 B2
(45) Date of Patent: Nov. 26, 2024

(54) METHOD AND DEVICE FOR USE IN WIRELESS COMMUNICATION NODE

(71) Applicants: Zheng Liu, Shanghai (CN); Xiaobo Zhang, Shanghai (CN); Lin Yang, Shanghai (CN)

(72) Inventors: Zheng Liu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 729 days.

(21) Appl. No.: 17/235,962

(22) Filed: Apr. 21, 2021

(65) Prior Publication Data

US 2021/0258121 A1 Aug. 19, 2021

Related U.S. Application Data

(63) Continuation of application No. PCT/CN2019/110591, filed on Oct. 11, 2019.

(30) Foreign Application Priority Data

Oct. 22, 2018 (CN) .......................... 201811229797.7

(51) Int. Cl.
*H04L 5/00* (2006.01)
*H04W 72/0453* (2023.01)
*H04W 72/23* (2023.01)

(52) U.S. Cl.
CPC ....... *H04L 5/0053* (2013.01); *H04W 72/0453* (2013.01); *H04W 72/23* (2023.01)

(58) Field of Classification Search
CPC .... H04L 5/0053; H04W 72/21; H04W 72/23; H04W 72/0453
See application file for complete search history.

(56) References Cited

U.S. PATENT DOCUMENTS 10,999,870 B2 * 5/2021 Ou ...................... H04W 74/008
11,160,057 B2 * 10/2021 Lin ....................... H04W 72/21
(Continued)

FOREIGN PATENT DOCUMENTS

| CN | 104796367 A | 7/2015 |
|---|---|---|
| CN | 107689855 A | 2/2018 |

(Continued)

OTHER PUBLICATIONS

ISR in application PCT/CN2019/110591 dated Dec. 11, 2019.
(Continued)

*Primary Examiner* — Kent Krueger

(57) ABSTRACT

The present disclosure provides a method and a device for use in wireless communication node. The communication node transmits first information; herein, for a given SCS, the communication node assumes that X1 PRB(s) is (are) comprised in frequency-domain resources that can be occupied by the communication node for transmissions, X1 being a positive integer, and the X1 PRB(s) occupies (occupy) consecutive frequency-domain resources; a position of the X1 PRB(s) in frequency domain is related to at least one of whether the communication node is in coverage or a synchronization reference source selected by the communication node; the first information is used to indicate a position of the X1 PRB(s) in frequency domain, and the first information is transmitted via an air interface. The method in the present disclosure reduces interference and improves link and system performance.

18 Claims, 10 Drawing Sheets

(56) References Cited

U.S. PATENT DOCUMENTS

| | | | |
|---|---|---|---|
| 2019/0116007 A1* | 4/2019 | Yi | H04W 72/0453 |
| 2019/0229867 A1* | 7/2019 | Yi | H04L 5/0048 |
| 2019/0281565 A1* | 9/2019 | Zhang | H04W 72/0453 |
| 2020/0280962 A1* | 9/2020 | Li | H04W 72/04 |
| 2020/0280964 A1* | 9/2020 | Li | H04L 5/0064 |
| 2020/0404537 A1* | 12/2020 | Harada | H04L 5/0053 |

FOREIGN PATENT DOCUMENTS

| | | |
|---|---|---|
| CN | 107920364 A | 4/2018 |
| CN | 108235435 A | 6/2018 |
| CN | 108633059 A | 10/2018 |
| EP | 3285415 A1 | 2/2018 |
| WO | 2017118778 A1 | 7/2017 |
| WO | 2017123279 A1 | 7/2017 |
| WO | 2017160222 A1 | 9/2017 |
| WO | 2018030415 A1 | 2/2018 |
| WO | 2018095199 A1 | 5/2018 |

OTHER PUBLICATIONS

The extended European search report in application EP19875544.9 dated Oct. 25, 2021.
First Office Action received in application No. CN201811229797.7 dated Oct. 11, 2021.
First Search Report received in application No. CN201811229797.7 dated Sep. 24, 2021.

\* cited by examiner

|  | $X \bmod 2 = 0$ | $X \bmod 2 = 1$ |
|---|---|---|
| Subcarrier index (starting from 0) | 0 | 6 |
| Physical Resource Block index | $Y1 = \dfrac{X}{2}$ | $Y2 = \dfrac{X-1}{2}$ |

METHOD AND DEVICE FOR USE IN WIRELESS COMMUNICATION NODE

CROSS REFERENCE TO RELATED APPLICATIONS

This application is a continuation of International Application No. PCT/CN2019/110591, filed Oct. 11, 2019, claims the priority benefit of Chinese Patent Application No. 201811229797.7, filed on Oct. 22, 2018, the full disclosure of which is incorporated herein by reference.

BACKGROUND

Technical Field

The present disclosure relates to transmission methods and devices in wireless communication systems, and in particular to a scheme and device for Internet of Vehicles (IoV) in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary, the technical Study Item (SI) of NR V2X was approved.

SUMMARY

Compared with the existing LTE system, a remarkable feature of 5G NR is that it can support a variety of Subcarrier Spacings (SCSs). In the design of Channel Raster and Synchronization Raster, support for the variety of SCSs is also taken into full consideration in NR. At the same time, in order to support the smooth evolution from LTE to NR and the smooth refarming of spectrum, in the design of NR, a shift on an uplink subcarrier or a grid of a Physical Resource Block (PRB) on a specific band is supported in the design of NR to ensure that an LTE's subcarrier and an NR's subcarrier or a boundary of an LTE's PRB and a boundary of an NR's PRB can be aligned under a same SCS.

In view of the problem of alignment of subcarriers and boundaries of PRBs in NR V2X, the present disclosure provides a solution. It should be noted that the embodiments of a first communication node and a second communication node in the present disclosure and the characteristics of the embodiments may be applied to other communication nodes if no conflict is incurred, and vice versa. And the embodiments in the present disclosure and the characteristics in the embodiments can be arbitrarily combined if there is no conflict. In particular, the solution disclosed in the present disclosure can be used in NR V2X communications, and also in communication process of other wireless communication systems.

The present disclosure provides a method in a first communication node for wireless communications, comprising:
transmitting first information;
herein, for a given SCS, the first communication node assumes that X1 PRB(s) is (are) comprised in frequency-domain resources that can be occupied by the first communication node for transmissions, X1 being a positive integer, and the X1 PRB(s) occupies (occupy) consecutive frequency-domain resources; a position of the X1 PRB(s) in frequency domain is related to at least one of whether the first communication node is in coverage or a synchronization reference source selected by the first communication node; the first information is used to indicate a position of the X1 PRB(s) in frequency domain, and the first information is transmitted via an air interface.

In one embodiment, a position of the X1 PRB(s) in frequency domain being indicated by the first information helps a receiving end determine a grid of subcarriers with which a receiving subcarrier is aligned for receptions, so as to avoid extra frequency error caused by a grid shift, thus improving the receiving performance.

In one embodiment, under normal circumstances, the receiver cannot distinguish whether a smaller (such as 7.5 kHz) frequency offset is caused by an initial frequency offset or a grid shift when receiving a synchronization signal, thus, in the case of the grid shift, the receiver mistakenly considers that frequency on the synchronization raster is frequency of real synchronization signal, which leads to the introduction of sampling error (or time drift) when receiving and processing a signal other than the synchronization signal, resulting in sharp decline in link performance. By introducing the first information, the sampling error caused when receiving and processing a signal other than the synchronization signal is avoided, which improves receiving performance of the receiver.

In one embodiment, associating a position of the X1 PRB(s) in frequency domain with at least one of whether the first communication node is in coverage or a synchronization reference source selected by the first communication node provides a method for judging frequency offset state employed by a PRB or a grid of a subcarrier according to coverage state and synchronization reference selections, so that the first communication node can judge whether a grid offset is employed for transmissions on a Sidelink according to interference state on a Uu interface or a network indication, so as to reduce interference between the Sidelink and the Uu interface and improve overall performance of the network.

In one embodiment, associating a position of the X1 PRB(s) in frequency domain with at least one of whether the first communication node is in coverage or a synchronization reference source selected by the first communication node can also optimize the performance of the system between the receiving performance (especially the synchronization performance) and reducing interference, so as to maximize transmission performance.

According to one aspect of the present disclosure, the above method is characterized in also comprising:
transmitting a first radio signal;
herein, for an SCS of a subcarrier occupied by the first radio signal, the first communication node assumes that X2 PRB(s) is (are) comprised in frequency-domain resources that can be occupied by the first communication node for transmissions, X2 being a positive integer; there exists (exist) X3 PRB(s) out of the X2 PRB(s), frequency-domain resources occupied by the first radio signal belong to frequency-domain resources occupied by the X3 PRB(s), any of the X3 PRB(s) is one of the X2 PRB(s), X3 being a positive integer not greater than X2; any of the X1 PRB(s) consists of at least one PRB in the X2 PRB(s), or any of the X2 PRB(s) consists of at least one PRB in the X1 PRB(s).

According to one aspect of the present disclosure, the above method is characterized in that for the given SCS, the first communication node assumes that any of the X1 PRB(s) is one of X PRB(s), X being a positive integer not less than X1, and the X PRB(s) occupies (occupy) consecutive frequency-domain resources; a first reference frequency is a frequency within frequency-domain resources comprised in the X PRB(s), for the given SCS and X, a relative position of the first reference frequency in frequency-domain resources comprised in the X PRB(s) is fixed; the first information is used to indicate an absolute position of the first reference frequency in frequency domain.

According to one aspect of the present disclosure, the above method is characterized in that the X PRB(s) is (are) indexed from 0 to X−1 according to frequency in an ascending order;

when X is an even number, a PRB with an index value equal to Y1 in the X PRB(s) is a first PRB, Y1 is equal to half of X, the first reference frequency is equal to a characteristic frequency of a subcarrier with a lowest frequency belonging to the first PRB; when X is an odd number, a PRB with an index value equal to Y2 in the X PRB(s) is a second PRB, the first reference frequency is equal to a characteristic frequency of a 7-th subcarrier arranged according to frequency in an ascending order belonging to the second PRB, Y2 is equal to half of a difference of X minus 1.

According to one aspect of the present disclosure, the above method is characterized in that when the first communication node is in coverage, a position of the X1 PRB(s) in frequency domain is related to a type of a serving cell of the first communication node.

In one embodiment, a position of the X1 PRB(s) in frequency domain is (are) associated with a type of a serving cell of the first communication node, so when a serving cell selected by the first communication node is LTE, the interference to transmission of Uu interface of LTE is reduced.

According to one aspect of the present disclosure, the above method is characterized in that a position of the X1 PRB(s) in frequency domain is related to a position of a band to which the X1 PRB(s) belongs (belong) in frequency domain.

According to one aspect of the present disclosure, the above method is characterized in also comprising:

receiving second information;

herein, the second information is used to determine a first frequency offset, the first frequency offset is equal to 0 kHz or 7.5 kHz, and the first information is used to indicate the first frequency offset; for the given SCS, the first frequency offset is equal to a frequency offset between a subcarrier comprised in the X1 PRB(s) and a subcarrier grid determined by a frequency on a channel raster, or the first frequency offset is equal to a frequency offset between a subcarrier comprised in the X1 PRB(s) and a subcarrier grid determined by a frequency on a synchronization raster.

According to one aspect of the present disclosure, the above method is characterized in also comprising:

transmitting third information;

herein, the third information is used to indicate a second frequency offset, and the second frequency offset is equal to 0 kHz or 7.5 kHz; the second frequency offset is a frequency offset between a subcarrier assumed by the first communication node for receptions and a subcarrier grid determined by a frequency on a channel raster, or the second frequency offset is a frequency offset between a subcarrier assumed by the first communication node for receptions and a subcarrier grid determined by a frequency on a synchronization raster.

In one embodiment, the introducing of third information enables that the transmitting end can judge whether a shift is carried out on a PRB grid or a subcarrier grid according to demands of the receiving end (such as magnitude of interference experienced by the receiving end), which further improves transmission performance.

According to one aspect of the present disclosure, the above method is characterized in that a carrier to which the X1 PRB(s) belongs (belong) in frequency domain is a first carrier, a band to which the first carrier belongs is a first band, a Radio Access Technology (RAT) employed in transmission in the first carrier is a first RAT, a position of the X1 PRB(s) in frequency domain is related to whether there exist frequency-domain resources in the first band that can be used for radio signal transmission employing a second RAT, and the second RAT is an RAT other than the first RAT.

In one embodiment, when the first communication node supports transmission of LTE V2X and NR V2X sharing a band, a position of the X1 PRB(s) in frequency domain is (are) associated with whether exist frequency-domain resources in the first band that can be used for radio signal transmission employing a second RAT, which can reduce interference caused by out-of-band emission between LTE V2X and NR V2X, thus improving transmission performance.

The present disclosure provides a method in a second communication node for wireless communications, comprising:

receiving first information;

herein, for a given SCS, the second communication node assumes that X1 PRB(s) is (are) comprised in frequency-domain resources that can be occupied by a transmitter of the first information for transmissions, X1 being a positive integer, and the X1 PRB(s) occupies (occupy) consecutive frequency-domain resources; a position of the X1 PRB(s) in frequency domain is related to at least one of whether the transmitter of the first information is in coverage or a synchronization reference source selected by the transmitter of the first information; the first information is used to indicate a position of the X1 PRB(s) in frequency domain, and the first information is transmitted via an air interface.

According to one aspect of the present disclosure, the above method is characterized in also comprising:

receiving a first radio signal;

herein, for an SCS of a subcarrier occupied by the first radio signal, the second communication node assumes that X2 PRB(s) is (are) comprised in frequency-domain resources that can be occupied by a transmitter of the first radio signal for transmissions, X2 being a positive integer; there exists (exist) X3 PRB(s) out of the X2 PRB(s), frequency-domain resources occupied by the first radio signal belong to frequency-domain resources occupied by the X3 PRB(s), any of the X3 PRB(s) is one of the X2 PRB(s), X3 being a positive integer not greater than X2; any of the X1 PRB(s) consists of at least one PRB in the X2 PRB(s), or any of the X2 PRB(s) consists of at least one PRB in the X1 PRB(s).

According to one aspect of the present disclosure, the above method is characterized in that for the given SCS, the second communication node assumes that any of the X1 PRB(s) is one of X PRB(s), X being a positive integer not less than X1, and the X PRB(s) occupies (occupy) consecutive frequency-domain resources; a first reference frequency is a frequency within frequency-domain resources comprised in the X PRB(s), for the given SCS and X, a relative position of the first reference frequency in frequency-domain resources comprised in the X PRB(s) is fixed; the first information is used to indicate an absolute position of the first reference frequency in frequency domain.

According to one aspect of the present disclosure, the above method is characterized in that the X PRB(s) is (are) indexed from 0 to X−1 according to frequency in an ascending order; when X is an even number, a PRB with an index value equal to Y1 in the X PRB(s) is a first PRB, Y1 is equal to half of X, the first reference frequency is equal to a characteristic frequency of a subcarrier with a lowest frequency belonging to the first PRB; when X is an odd number, a PRB with an index value equal to Y2 in the X PRB(s) is a second PRB, the first reference frequency is equal to a characteristic frequency of a 7-th subcarrier arranged according to frequency in an ascending order belonging to the second PRB, Y2 is equal to half of a difference of X minus 1.

According to one aspect of the present disclosure, the above method is characterized in that when the transmitter of the first information is in coverage, a position of the X1 PRB(s) in frequency domain is related to a type of a serving cell of the transmitter of the first information.

According to one aspect of the present disclosure, the above method is characterized in that a position of the X1 PRB(s) in frequency domain is related to a position of a band to which the X1 PRB(s) belongs (belong) in frequency domain.

According to one aspect of the present disclosure, the above method is characterized in also comprising:
    receiving third information;
    herein, the third information is used to indicate a second frequency offset, and the second frequency offset is equal to 0 kHz or 7.5 kHz; the second frequency offset is a frequency offset between a subcarrier assumed by a transmitter of the third information for receptions and a subcarrier grid determined by a frequency on a channel raster, or the second frequency offset is a frequency offset between a subcarrier assumed by a transmitter of the third information for receptions and a subcarrier grid determined by a frequency on a synchronization raster.

According to one aspect of the present disclosure, the above method is characterized in that a carrier to which the X1 PRB(s) belongs (belong) in frequency domain is a first carrier, a band to which the first carrier belongs is a first band, an RAT employed in transmission in the first carrier is a first RAT, a position of the X1 PRB(s) in frequency domain is related to whether there exist frequency-domain resources in the first band that can be used for radio signal transmission employing a second RAT, and the second RAT is an RAT other than the first RAT.

The present disclosure provides a first communication node for wireless communications, comprising:
    a first transceiver, which transmits first information;
    herein, for a given SCS, the first communication node assumes that X1 PRB(s) is (are) comprised in frequency-domain resources that can be occupied by the first communication node for transmissions, X1 being a positive integer, and the X1 PRB(s) occupies (occupy) consecutive frequency-domain resources; a position of the X1 PRB(s) in frequency domain is related to at least one of whether the first communication node is in coverage or a synchronization reference source selected by the first communication node; the first information is used to indicate a position of the X1 PRB(s) in frequency domain, and the first information is transmitted via an air interface.

According to one aspect of the present disclosure, the above first communication node is characterized in also comprising:
    a first transmitter, which transmits a first radio signal;
    herein, for an SCS of a subcarrier occupied by the first radio signal, the first communication node assumes that X2 PRB(s) is (are) comprised in frequency-domain resources that can be occupied by the first communication node for transmissions, X2 being a positive integer; there exists (exist) X3 PRB(s) out of the X2 PRB(s), frequency-domain resources occupied by the first radio signal belong to frequency-domain resources occupied by the X3 PRB(s), any of the X3 PRB(s) is one of the X2 PRB(s), X3 being a positive integer not greater than X2; any of the X1 PRB(s) consists of at least one PRB in the X2 PRB(s), or any of the X2 PRB(s) consists of at least one PRB in the X1 PRB(s).

The present disclosure provides a second communication node for wireless communications, comprising:
    a first receiver, which receives first information;
    herein, for a given SCS, the second communication node assumes that X1 PRB(s) is (are) comprised in frequency-domain resources that can be occupied by a transmitter of the first information for transmissions, X1 being a positive integer, and the X1 PRB(s) occupies (occupy) consecutive frequency-domain resources; a position of the X1 PRB(s) in frequency domain is related to at least one of whether the transmitter of the first information is in coverage or a synchronization reference source selected by the transmitter of the first information; the first information is used to indicate a position of the X1 PRB(s) in frequency domain, and the first information is transmitted via an air interface.

According to one aspect of the present disclosure, the above second communication node is characterized in also comprising:
    a second receiver, which receives a first radio signal;
    herein, for an SCS of a subcarrier occupied by the first radio signal, the second communication node assumes that X2 PRB(s) is (are) comprised in frequency-domain resources that can be occupied by a transmitter of the first radio signal for transmissions, X2 being a positive integer; there exists (exist) X3 PRB(s) out of the X2 PRB(s), frequency-domain resources occupied by the first radio signal belong to frequency-domain resources occupied by the X3 PRB(s), any of the X3 PRB(s) is one of the X2 PRB(s), X3 being a positive integer not greater than X2; any of the X1 PRB(s) consists of at least one PRB in the X2 PRB(s), or any of the X2 PRB(s) consists of at least one PRB in the X1 PRB(s).

In one embodiment, the present disclosure is advantageous in the following aspects:

the method in the present disclosure avoids extra frequency error caused by grid shift, thus improving receiving performance.

the method in the present disclosure avoids the sampling error caused when a signal other than the synchronization signal is received and processed, thus improving receiving performance of the receiver.

the method in the present disclosure enables the transmitting end to judge whether a grid shift is adopted in transmission on Sidelink according to interference condition on a Uu interface or network indication, so as to reduce interference between the Sidelink and the Uu interface, thus improving overall performance of the network.

the method in the present disclosure can optimize the performance of the system between receiving performance (especially synchronization performance) and reducing interference, thus maximizing the transmission performance.

the method in the present disclosure enables that when a serving cell selected by the transmitting end is LTE, the interference to transmission of the Uu interface of LTE is reduced.

the method in the present disclosure enables that the transmitting end can judge whether a shift is carried out on a PRB grid or a subcarrier grid according to demands of the receiving end (such as magnitude of interference experienced by the receiving end), which further improves transmission performance.

adopting the method in the present disclosure, when the transmitting end supports transmission of LTE V2X and NR V2X sharing a band, interference caused by Out-of-Band Emission (Out-of-Band Emission or self-interference) between LTE V2X and NR V2X is reduced, thus further improving transmission performance.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
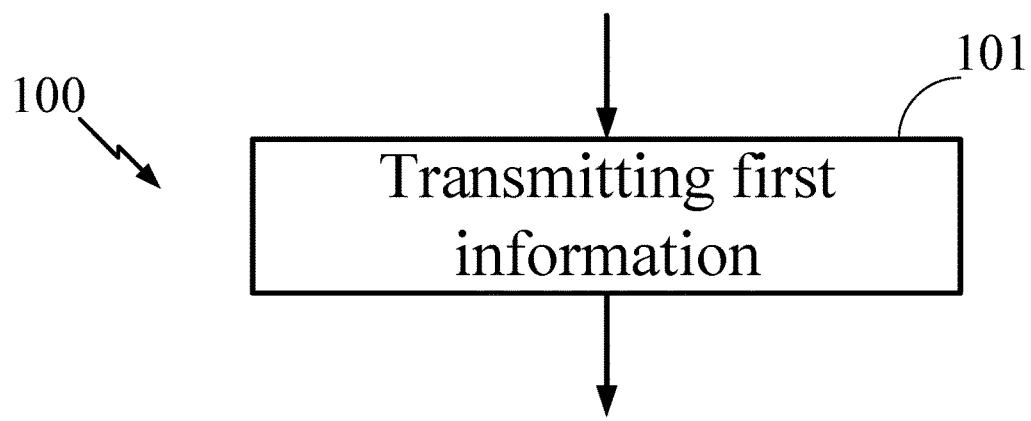
FIG. 1 is a flowchart of transmission of first information according to one embodiment of the present disclosure.

Embodiment 1 illustrates a flowchart of transmission of first information according to one embodiment of the present disclosure, as shown in FIG. 1. In FIG. 1, each box represents a step.

In Embodiment 1, a first communication node in the present disclosure transmits first information; herein, for a given SCS, the first communication node assumes that X1 PRB(s) is (are) comprised in frequency-domain resources that can be occupied by the first communication node for transmissions, X1 being a positive integer, and the X1 PRB(s) occupies (occupy) consecutive frequency-domain resources; a position of the X1 PRB(s) in frequency domain is related to at least one of whether the first communication node is in coverage or a synchronization reference source selected by the first communication node; the first information is used to indicate a position of the X1 PRB(s) in frequency domain, and the first information is transmitted via an air interface.

In one embodiment, the first information being used to indicate a position of the X1 PRB(s) in frequency domain includes: the first information is used to indicate at least one of whether the first communication node is in coverage or a synchronization reference source selected by the first communication node.

In one embodiment, the first information is transmitted via a PC5 interface.

In one embodiment, the first information is transmitted through a Sidelink.

In one embodiment, the first information is a piece of physical-layer information.

In one embodiment, the first information is a piece of higher-layer information.

In one embodiment, the first information is transmitted via a physical layer signaling.

In one embodiment, the first information is Broadcast.

In one embodiment, the first information is Unicast.

In one embodiment, the first information is Groupcast/Multicast.

In one embodiment, the first information is transmitted through a Physical Sidelink Broadcast Channel (PSBCH).

In one embodiment, the first information is transmitted through a Sidelink Broadcast Channel (SL-BCH).

In one embodiment, the first information carries all or partial Information Elements (IEs) in a Master Information Block Sidelink (MIB-SL).

In one embodiment, the first information carries all or partial fields in an IE in an MIB-SL.

In one embodiment, the first information carries all or partial IEs in a Master Information Block Sidelink V2X (MIB-SL-V2X).

In one embodiment, the first information carries all or partial fields in an IE in an MIB-SL-V2X.

In one embodiment, the first information carries all or part of a Remaining System Information Sidelink (RMSI-SL).

In one embodiment, the first information is transmitted through a Physical Sidelink Control Channel (PSCCH).

In one embodiment, the first information is transmitted through a Physical Sidelink Shared Channel (PSSCH).

In one embodiment, the first information comprises all or part of a piece of Sidelink Control Information (SCI).

In one embodiment, the first information comprises all or partial fields in a piece of SCI.

In one embodiment, the first information comprises all or part of a piece of Sidelink Feedback Control Information (SFCI).

In one embodiment, the first information comprises all or part of a high-layer signaling.

In one embodiment, the first information comprises all or partial IEs in a higher-layer signaling.

In one embodiment, the first information comprises all or partial fields in an IE in a higher-layer signaling.

In one embodiment, the first information comprises all or partial IEs in a Radio Resource Control (RRC) signaling.

In one embodiment, the first information comprises all or partial fields in an IE in an RRC signaling.

In one embodiment, frequency-domain resources occupied by transmitting the first information belong to frequency-domain resources assumed to be occupied by the first communication node for transmissions.

In one embodiment, frequency-domain resources occupied by transmitting the first information don't belong to frequency-domain resources assumed to be occupied by the first communication node for transmissions.

In one embodiment, the first information being used to indicate a position of the X1 PRB(s) in frequency domain refers to: the first information is used by the first communication node to indicate a position of the X1 PRB(s) in frequency domain.

In one embodiment, the first information being used to indicate a position of the X1 PRB(s) in frequency domain refers to: the first information is used to directly indicate a position of the X1 PRB(s) in frequency domain.

In one embodiment, the first information being used to indicate a position of the X1 PRB(s) in frequency domain refers to: the first information is used to indirectly indicate a position of the X1 PRB(s) in frequency domain.

In one embodiment, the first information being used to indicate a position of the X1 PRB(s) in frequency domain refers to: the first information is used to explicitly indicate a position of the X1 PRB(s) in frequency domain.

In one embodiment, the first information being used to indicate a position of the X1 PRB(s) in frequency domain refers to: the first information is used to implicitly indicate a position of the X1 PRB(s) in frequency domain.

In one embodiment, the first information is transmitted in a first time window, and a receiver of the first information can assume that content carried by the first information is not changed in the first time window; a time length of the first time window is fixed, or a time length of the first time window is configurable.

In one embodiment, the first information is transmitted in a first time window, and a receiver of the first information can assume that the first information is valid in the first time window; a time length of the first time window is fixed, or a time length of the first time window is configurable.

In one embodiment, the given SCS is one of 15 kHz, 30 kHz, 60 kHz, 120 kHz or 240 kHz.

In one embodiment, frequency-domain resources occupied by the first communication node for transmissions refers to: frequency-domain resources within transmit radio frequency bandwidth of the first communication node.

In one embodiment, frequency-domain resources occupied by the first communication node for transmissions refers to: frequency-domain resources within a largest transmission bandwidth that can be supported by the first communication node for transmissions.

In one embodiment, frequency-domain resources occupied by the first communication node for transmissions refers to: frequency-domain resources within largest transmission bandwidth configuration that can be supported by the first communication node for transmissions.

In one embodiment, frequency-domain resources occupied by the first communication node for transmissions refers to: frequency-domain resources within a transmission bandwidth that can be supported by the first communication node for transmissions.

In one embodiment, frequency-domain resources occupied by the first communication node for transmissions refers to: frequency-domain resources within a maximum Bandwidth Part (BWP) that can be supported by the first communication node for transmissions.

In one embodiment, frequency-domain resources occupied by the first communication node for transmissions refers to: frequency-domain resources can be occupied by the first communication node in a time window for transmissions.

In one embodiment, the X1 PRB(s) is (are) X1 virtual PRB(s) of the first communication node for transmissions.

In one embodiment, the X1 PRB(s) is (are) X1 real PRB(s) of the first communication node for transmissions.

In one embodiment, the X1 PRB(s) is (are) used by the first communication node as a grid for dividing frequency domain.

In one embodiment, the X1 PRB(s) is (are) used by the first communication node as a frequency-domain position of a channel or a signal for transmissions.

In one embodiment, the X1 PRB(s) is (are) used by the first communication node as a frequency-domain position of a carrier for transmissions.

In one embodiment, the X1 PRB(s) is (are) X1 Common Resource Block(s) (CRB).

In one embodiment, the X1 PRB(s) is (are) used to determine frequency-domain positions of a RF signal, an SS/PBCH Block and other signals or channels.

In one embodiment, the X1 PRB(s) occupies (occupy) all frequency-domain resources that can be occupied by the first communication node for transmissions.

In one embodiment, frequency-domain resources that can be occupied by the first communication node for transmissions are frequency-domain resources occupied by the X1 PRB(s).

In one embodiment, frequency-domain resources that can be occupied by the first communication node for transmissions only comprise frequency-domain resources occupied by the X1 PRB(s).

In one embodiment, frequency-domain resources that can be occupied by the first communication node for transmissions comprise frequency-domain resources other than frequency-domain resources occupied by the X1 PRB(s).

In one embodiment, frequency-domain resources that can be occupied by the first communication node for transmissions comprise frequency-domain resources and guard band resources occupied by the X1 PRB(s).

In one embodiment, frequency-domain resources that can be occupied by the first communication node for transmissions comprise frequency-domain resources and guard band resources occupied by the X1 PRB(s), and frequency-domain resources occupied by other PRBs.

In one embodiment, frequency-domain resources occupied by the X1 PRB(s) is (are) occupied by a physical channel or a channel.

In one embodiment, for the given SCS, each of the X1 PRB(s) comprises 12 consecutive subcarriers in frequency domain.

In one embodiment, the X1 is equal to 20.

In one embodiment, the X1 is equal to 21.

In one embodiment, the X1 is greater than 21.

In one embodiment, the X1 PRB(s) is (are) PRB(s) consisting an SS/PBCH Block, and the given SCS is equal to an SCS of a subcarrier occupied by the SS/PBCH Block.

In one embodiment, the X1 PRB(s) is (are) PRB(s) consisting a Sidelink SS/PBCH Block, and the given SCS is equal to an SCS of a subcarrier occupied by the SS/PBCH Block.

In one embodiment, the given SCS is equal to an SCS of a subcarrier occupied by an SS/PBCH Block, and the X1 PRB(s) comprises (comprise) frequency-domain resources occupied by the SS/PBCH Block.

In one embodiment, the given SCS is equal to an SCS of a subcarrier occupied by an SS/PBCH Block, and the X1 is equal to a minimum positive integer satisfying that frequency-domain resources occupied by the SS/PBCH Block comprised in the X1 PRB(s).

In one embodiment, the X1 PRB(s) comprises (comprise) frequency-domain resources occupied by an SS/PBCH Block, and a floating SS/PBCH Block is supported in frequency-domain resources of the X1 PRB(s).

In one embodiment, for the given SCS, the X1 PRB(s) is (are) PRB(s) that can be supported by the first communication node within a largest transmission bandwidth.

for the given SCS, the X1 PRB(s) is (are) PRB(s) that can be supported by the first communication node within largest transmission bandwidth configuration.

In one embodiment, for the given SCS, the X1 PRB(s) is (are) PRB(s) that can be supported by the first communication node in a transmitting carrier.

In one embodiment, for the given SCS, the X1 PRB(s) is (are) PRB(s) that can be supported by the first communication node within a largest transmission bandwidth configuration, and the X1 is equal to an $N_{RB}$ in 3GPP TS38. 101-1 (V15.3.0), table 5. 3. 2-1.

In one embodiment, a structure between the X1 PRB(s) and a CRB in a carrier to which the X1 PRB(s) belongs (belong) conforms to a Nested Structure.

In one embodiment, a structure between the X1 PRB(s) and a CRB in a carrier to which the X1 PRB(s) belongs (belong) doesn't conform to a Nested Structure.

In one embodiment, a structure between a subcarrier in the X1 PRB(s) and a subcarrier in a CRB in a carrier to which the X1 PRB(s) belongs (belong) conforms to a Nested Structure.

In one embodiment, when the given SCS is not less than an SCS of a subcarrier in a CRB in a carrier to which the X1 PRB(s) belongs (belong), a boundary of each of the X1 PRB(s) is not aligned with a boundary of any CRB.

In one embodiment, when the given SCS is not less than an SCS of a subcarrier in a CRB in a carrier to which the X1 PRB(s) belongs (belong), a boundary of each of the X1 PRB(s) is aligned with a boundary of a CRB.

In one embodiment, when the given SCS is greater than an SCS of a subcarrier in a CRB in a carrier to which the X1 PRB(s) belongs (belong), a boundary of any of the X1 PRB(s) is not aligned with a boundary of any CRB.

In one embodiment, when the given SCS is greater than an SCS of a subcarrier in a CRB in a carrier to which the X1 PRB(s) belongs (belong), there exits one of the X1 PRB(s) whose boundary is aligned with a boundary of a CRB.

In one embodiment, when the given SCS is not less than an SCS of a subcarrier in a CRB in a carrier to which the X1 PRB(s) belongs (belong), a boundary of each subcarrier of the X1 PRB(s) is aligned with a boundary of a subcarrier in a CRB.

In one embodiment, when the given SCS is greater than an SCS of a subcarrier in a CRB in a carrier to which the X1 PRB(s) belongs (belong), there exists a subcarrier of the X1 PRB(s) whose boundary is aligned with a boundary of a subcarrier of a CRB.

In one embodiment, a position of the X1 PRB(s) in frequency domain refers to frequency-domain a position of the X1 PRB(s) in a band to which the X1 physical resource(s) belongs (belong).

In one embodiment, a position of the X1 PRB(s) in frequency domain refers to a frequency offset between each of the X1 PRB(s) and a grid of a PRB determined by a channel raster, and the frequency offset is equal to 0 kHz or 7.5 kHz.

In one embodiment, a position of the X1 PRB(s) in frequency domain refers to a frequency offset between each of the X1 PRB(s) and a grid of a PRB determined by a New Radio Absolute Radio Frequency Channel Number (NR-ARFCN), and the frequency offset is equal to 0 kHz or 7.5 kHz.

In one embodiment, a position of the X1 PRB(s) in frequency domain refers to a frequency offset between each of the X1 PRB(s) and a grid of a PRB in an SS/PBCH Block determined by a synchronization raster, and the frequency offset is equal to 0 kHz or 7.5 kHz.

In one embodiment, the X1 PRB(s) comprises (comprise) frequency-domain resources occupied by an SS/PBCH Block, and a position of the X1 PRB(s) in frequency domain refers to a frequency-domain position of an SS/PBCH Block in a band to which the X1 PRB(s) belongs (belong).

In one embodiment, the X1 PRB(s) comprises (comprise) frequency-domain resources occupied by a Sidelink SS/PBCH Block, and a position of the X1 PRB(s) in frequency domain refers to a position of a Sidelink SS/PBCH Block in frequency-domain in a band to which the X1 PRB(s) belongs (belong).

In one embodiment, the X1 PRB(s) comprises (comprise) frequency-domain resources occupied by a Sidelink SS/PBCH Block, and a position of the X1 PRB(s) in frequency domain refers to a position of a characteristic frequency in frequency-domain resources occupied by a Sidelink SS/PBCH Block in frequency domain in a band to which the X1 PRB(s) belongs (belong).

In one embodiment, for the given SCS, the X1 PRB(s) is (are) PRB(s) that can be supported within a largest transmission bandwidth by the first communication node for transmissions, and a position of the X1 PRB(s) in frequency domain refers to a position of frequency-domain resources within a largest transmission bandwidth of a first communication node for transmissions in frequency domain in a band to which the X1 physical resource(s) belongs (belong).

In one embodiment, for the given SCS, the X1 PRB(s) is (are) PRB(s) that can be supported by the first communication node for transmissions within a largest transmission bandwidth, and a position of the X1 PRB(s) in frequency domain refers to a position of a characteristic frequency in frequency-domain resources within a largest transmission bandwidth of a first communication node for transmissions in frequency domain in a band to which the X1 physical resource(s) belongs (belong).

In one embodiment, for the given SCS, the X1 PRB(s) is (are) PRB(s) that can be supported within largest transmission bandwidth configuration by the first communication node for transmissions, and a position of the X1 PRB(s) in frequency domain refers to a position of frequency-domain resources within largest transmission bandwidth configuration of the first communication node for transmissions in frequency domain in a band to which the X1 PRB(s) belongs (belong).

In one embodiment, for the given SCS, the X1 PRB(s) is (are) PRB(s) that can be supported within largest transmission bandwidth configuration by the first communication node for transmissions, and a position of the X1 PRB(s) in frequency domain refers to a position of a characteristic frequency in frequency-domain resources within largest transmission bandwidth configuration of the first communication node for transmissions in frequency domain in a band to which the X1 PRB(s) belongs (belong).

In one embodiment, for the given SCS, the X1 PRB(s) is (are) PRB(s) that can be supported by the first communication node in a transmission carrier, and a position of the X1 PRB(s) in frequency domain refers to a position of a transmission carrier to which the X1 PRB(s) belongs (belong) in frequency domain in a band to which the X1 PRB(s) belongs (belong).

In one embodiment, for the given SCS, the X1 PRB(s) is (are) PRB(s) that can be supported by the first communication node in a transmission carrier, and a position of the X1 PRB(s) in frequency domain refers to a position of a characteristic frequency in a transmission carrier to which the X1 PRB(s) belongs (belong) in frequency domain in a band to which the X1 PRB(s) belongs (belong).

In one embodiment, whether the first communication node is in coverage refers to whether the first communication node is in coverage of a cellular cell.

In one embodiment, whether the first communication node is in coverage refers to whether the first communication node is in coverage of an NR cell.

In one embodiment, whether the first communication node is in coverage refers to whether the first communication node is in coverage of a Long Term Evolution (LTE) cell.

In one embodiment, whether the first communication node is in coverage refers to whether the first communication node can find a cell meeting S criterion.

In one embodiment, whether the first communication node is in coverage refers to whether the first communication node can find a cell meeting S criterion defined in 3GPP TS36. 304 (v15. 0. 0), or whether the first communication node can find a cell meeting S criterion defined in 3GPP TS38. 304 (v15. 0. 0).

In one embodiment, whether the first communication node is in coverage refers to: when the first communication node finds a cell meeting S criterion, then the first communication node is assumed to be in coverage; when the first communication node cannot find a cell meeting S criterion, the first communication node is assumed to be out-of-coverage, and the S criterion comprises any one of the S criterion in LTE or the S criterion in NR.

In one embodiment, whether the first communication node is in coverage is determined according to definition given in 3GPP TS36.304 (v15.0.0), section 11. 4.

In one embodiment, whether the first communication node is in coverage comprises: whether the first communication node is in coverage of LTE and whether the first communication node is in the coverage of NR.

In one embodiment, whether the first communication node is in coverage only comprises whether the first communication node is in coverage of NR.

In one embodiment, whether the first communication node is in coverage refers to one of the first communication being in-LTE-coverage and the first communication node being in-NR-coverage, the first communication node being in-LTE-coverage and the first communication node being out-of-NR coverage, the first communication node being out-of-LTE-coverage and the first communication node being in-NR-coverage, or the first communication node being out-of-LTE-coverage and the first communication node being in-NR coverage.

In one embodiment, the first communication node being out-of-coverage refers to that the first communication node is out-of-LTE-coverage and the first communication node is out-of-NR-coverage.

In one embodiment, a synchronization reference source selected by the first communication node is one of a Global Navigation Satellite System (GNSS), eNB, gNB, a UE other than the first communication node or the first communication node itself.

In one embodiment, a synchronization reference source selected by the first communication node is one of a GNSS, an LTE base station, an NR base station, a UE other than the first communication node or the first communication node itself.

In one embodiment, a synchronization reference selected by the first communication node is used to determine at least one of transmission frequency and transmission timing of the first communication node.

In one embodiment, a synchronization reference selected by the first communication node is used to calibrate at least one of transmission frequency and transmission timing of the first communication node.

In one embodiment, a synchronization reference selected by the first communication node is used to adjust at least one of transmission frequency and transmission timing of the first communication node.

In one embodiment, a synchronization reference selected by the first communication node is used to calibrate crystal frequency of the first communication node.

In one embodiment, a position of the X1 PRB(s) in frequency domain being related to at least one of whether the first communication node is in coverage or a synchronization reference source selected by the first communication node includes: a position of the X1 PRB(s) in frequency domain is related to whether the first communication node is in coverage.

In one embodiment, a position of the X1 PRB(s) in frequency domain being related to at least one of whether the first communication node is in coverage or a synchronization reference source selected by the first communication node includes: a position of the X1 PRB(s) in frequency domain is related to a synchronization reference source selected by the first communication node.

In one embodiment, a position of the X1 PRB(s) in frequency domain being related to at least one of whether the first communication node is in coverage or a synchronization reference source selected by the first communication node includes: a position of the X1 PRB(s) in frequency domain is related to both whether the first communication node is in coverage and a synchronization reference source selected by the first communication node.

In one embodiment, a position of the X1 PRB(s) in frequency domain being related to at least one of whether the first communication node is in coverage or a synchronization reference source selected by the first communication node includes: a position of the X1 PRB(s) in frequency domain is related to a type of a synchronization reference source selected by the first communication node.

In one embodiment, a position of the X1 PRB(s) in frequency domain being related to at least one of whether the first communication node is in coverage or a synchronization reference source selected by the first communication node includes: a position of the X1 PRB(s) in frequency domain is related to both whether the first communication node is in coverage and a type of a synchronization reference source selected by the first communication node.

In one embodiment, a position of the X1 PRB(s) in frequency domain being related to at least one of whether the first communication node is in coverage or a synchronization reference source selected by the first communication node refers to: at least one of whether the first communication node is in coverage or a synchronization reference source selected by the first communication node is used to determine a position of the X1 PRB(s) in frequency domain.

In one embodiment, a position of the X1 PRB(s) in frequency domain being related to at least one of whether the first communication node is in coverage or a synchronization reference source selected by the first communication node refers to: a position of the X1 PRB(s) in frequency domain has a mapping relation with at least one of whether the first communication node is in coverage or a synchronization reference source selected by the first communication node.

In one embodiment, a position of the X1 PRB(s) in frequency domain being related to at least one of whether the first communication node is in coverage or a synchronization reference source selected by the first communication node refers to: a position of the X1 PRB(s) in frequency domain has a conditional relation with at least one of whether the first communication node is in coverage or a synchronization reference source selected by the first communication node.

In one embodiment, a position of the X1 PRB(s) in frequency domain being related to at least one of whether the first communication node is in coverage or a synchronization reference source selected by the first communication node refers to: at least one of whether the first communication node is in coverage or a synchronization reference source selected by the first communication node is used to determine a position of the X1 PRB(s) in frequency domain based on a mapping relation.

In one embodiment, a position of the X1 PRB(s) in frequency domain being related to at least one of whether the first communication node is in coverage or a synchronization reference source selected by the first communication node refers to: at least one of whether the first communication node is in coverage or a synchronization reference source selected by the first communication node is used to determine a position of the X1 PRB(s) in frequency domain based on a conditional relation.

In one embodiment, when the first communication node is out-of-coverage and a synchronization reference source selected by the first communication node is a GNSS, a position of the X1 PRB(s) in frequency domain is selected by the first communication node.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, the frequency offset is selected by the first communication node itself between 0 kHz and 7.5 kHz.

In one embodiment, a position of the X1 PRB(s) in frequency domain refers to a frequency offset between each of the X1 PRB(s) and a grid of a PRB determined by a ARFCN; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, the frequency offset is selected by the first communication node itself between 0 kHz and 7.5 kHz.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, the frequency offset is selected by the first communication node itself between 0 kHz and 7.5 kHz.

In one embodiment, a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, for the given SCS, each of the X1 PRB(s) is aligned with a grid of a PRB determined by a channel raster.

In one embodiment, a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, for the given SCS, a frequency offset between each of the X1 PRB(s) and a grid of a PRB determined by a channel raster is 0 kHz.

In one embodiment, a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, for the given SCS, each of the X1 PRB(s) is aligned with a grid of a PRB determined by a NR-ARFCN.

In one embodiment, a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, for the given SCS, a frequency offset between each of the X1 PRB(s) and a grid of a PRB determined by an NR-ARFCN is 0 kHz.

In one embodiment, a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, for the given SCS, each of the X1 PRB(s) is aligned with a grid of a PRB in an SS/PBCH Block determined by a synchronization raster.

In one embodiment, a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, for the given SCS, a frequency offset between each of the X1 PRB(s) and a grid of a PRB in an SS/PBCH Block determined by a synchronization raster is 0 kHz.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a base station (gNB) of NR, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a base station (gNB) of NR, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a base station (gNB) of NR, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a base station (eNB) of LTE, the frequency offset is selected by the first communication node itself out of 0 kHz and 7.5 kHz, or the frequency offset is equal to 7.5 kHz.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a base station (eNB) of LTE, the frequency offset is selected by the first communication node itself out of 0 kHz and 7.5 kHz, or the frequency offset is equal to 7.5 kHz.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a base station (eNB) of LTE, the frequency offset is selected by the first communication node itself out of 0 kHz and 7.5 kHz, or the frequency offset is equal to 7.5 kHz.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a UE other than the first communication node, the frequency offset is equal to a frequency offset of a UE of a synchronization reference source selected by the first communication node.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a UE other than the first communication node, the frequency offset is equal to a frequency offset of a UE of a synchronization reference source selected by the first communication node.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a UE other than the first communication node, the frequency offset is equal to a frequency offset of a UE of a synchronization reference source selected by the first communication node.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is out-of-coverage and the first communication node selects itself as a synchronization reference source, the frequency offset is selected by the first communication node itself, or the frequency offset is equal to 0 kHz.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is out-of-coverage and the first communication node selects itself as a synchronization reference source, the frequency offset is selected by the first communication node itself, or the frequency offset is equal to 0 kHz.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is out-of-coverage and the first communication node selects itself as a synchronization reference source, the frequency offset is selected by the first communication node itself, or the frequency offset is equal to 0 kHz.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is in-LTE-coverage but out-of-NR-coverage and a synchronization reference source selected by the first communication node is a GNSS, the frequency offset is selected by the first communication node itself out of 0 kHz and 7.5 kHz, or the frequency offset is equal to 7.5 kHz.

In one embodiment, a position of the X1 PRB(s) in frequency domain refers (refer) to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is in-LTE-coverage but out-of-NR-coverage and a synchronization reference source selected by the first communication node is a GNSS, the frequency offset is selected by the first communication node itself out of 0 kHz and 7.5 kHz, or the frequency offset is equal to 7.5 kHz.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is in-LTE-coverage but out-of-NR-coverage and a synchronization reference source selected by the first communication node is a GNSS, the frequency offset is selected by the first communication node itself out of 0 kHz and 7.5 kHz, or the frequency offset is equal to 7.5 kHz.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is in-LTE-coverage but out-of-NR-coverage and a synchronization reference source selected by the first communication node is a base station (eNB) of LTE, the frequency offset is equal to 7.5 kHz.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is in-LTE-coverage but out-of-NR-coverage and a synchronization reference source selected by the first communication node is a base station (eNB) of LTE, the frequency offset is equal to 7.5 kHz.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is in-LTE-coverage but out-of-NR-coverage and a synchronization reference source selected by the first communication node is a base station (eNB) of LTE, the frequency offset is equal to 7.5 kHz.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is in-NR-coverage but out-of-LTE-coverage (or LTE is not supported) and a synchronization reference source selected by the first communication node is a GNSS, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is in-NR-coverage but out-of-LTE-coverage (or LTE is not supported) and a synchronization reference source selected by the first communication node is a GNSS, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is in-NR-coverage but out-of-LTE-coverage (or LTE is not supported) and a synchronization reference source selected by the first communication node is a GNSS, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is in-NR-coverage but out-of-LTE-coverage (or LTE is not supported) and a synchronization reference source selected by the first communication node is a base station (gNB) of NR, the frequency offset follows indication of a base station (gNB) of NR.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is in-NR-coverage but out-of-LTE-coverage (or LTE is not supported) and a synchronization reference source selected by the first communication node is a base station (gNB) of NR, the frequency offset follows indication of a base station (gNB) of NR.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is in-NR-coverage but out-of-LTE-coverage (or LTE is not supported) and a synchronization reference source selected by the first communication node is a base station (gNB) of NR, the frequency offset follows indication of a base station (gNB) of NR.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a GNSS, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a GNSS, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a GNSS, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a base station (gNB) of NR, the frequency offset follows indication of a base station (gNB) of NR.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a base station (gNB) of NR, the frequency offset follows indication of a base station (gNB) of NR.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a base station (gNB) of NR, the frequency offset follows indication of a base station (gNB) of NR.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a base station (eNB) of LTE, the frequency offset is equal to 7.5 kHz.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a base station (eNB) of LTE, the frequency offset is equal to 7.5 kHz.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a base station (eNB) of LTE, the frequency offset is equal to 7.5 kHz.

In one embodiment, the air interface is wireless.

In one embodiment, the air interface comprises a radio channel.

In one embodiment, the air interface is an interface between the second communication node and the first communication node.

In one embodiment, the air interface is a Pc5 interface.

In one embodiment, the air interface is through a Sidelink.

Embodiment 2

Figure 2:
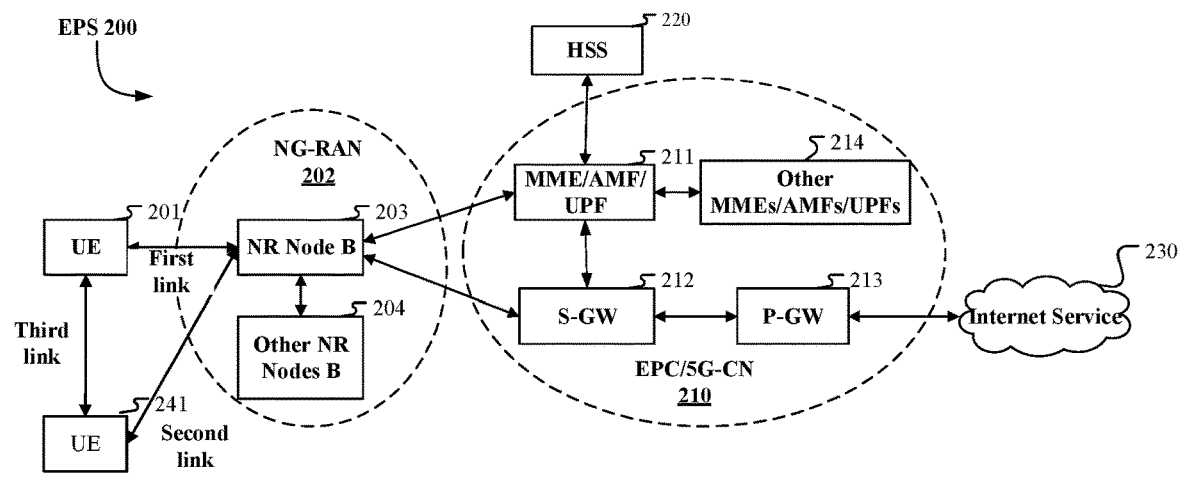
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In V2X network, the gNB 203 may be a base station, a terrestrial base station relayed via a satellites or a Road Side Unit (RSU) and etc. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, communication units in vehicles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/

5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first communication node in the present disclosure.

In one embodiment, the UE 201 supports Sidelink transmission.

In one embodiment, the UE 201 supports a PC5 interface.

In one embodiment, the UE201 supports IoV.

In one embodiment, the UE201 supports V2X traffic.

In one embodiment, the UE 241 corresponds to the second communication node in the present disclosure.

In one embodiment, the UE 241 supports Sidelink transmission.

In one embodiment, the UE 241 supports a PC5 interface.

In one embodiment, the UE241 supports IoV.

In one embodiment, the UE241 supports V2X traffic.

In one embodiment, the UE 201 and the UE 241 are in coverage of a same base station.

In one embodiment, the UE 201 and the UE 241 are in coverage of different base stations.

In one embodiment, the UE 201 and the UE 241 are out of coverage of any base station.

In one embodiment, one of the UE 201 and the UE 241 is in coverage of a base station, and the other is out of coverage of any base station.

Embodiment 3

Figure 3:
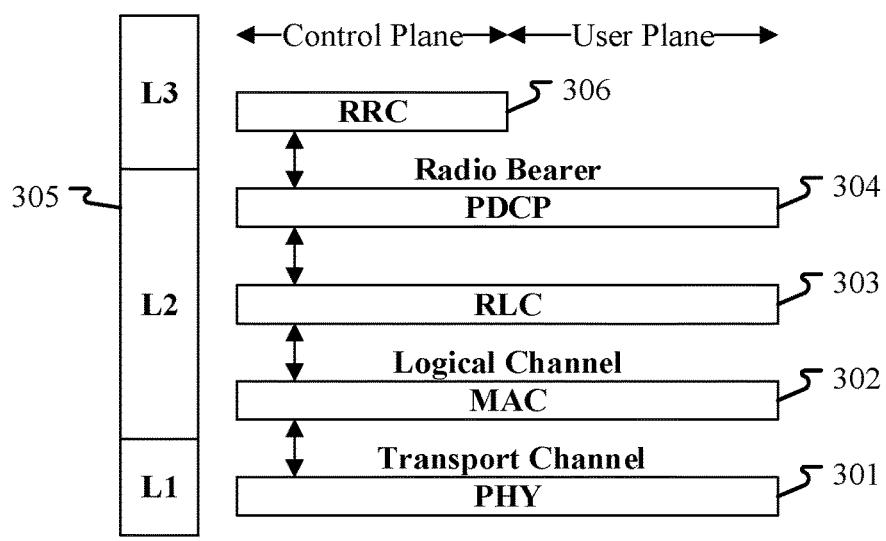
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane and a control plane (if supported). In FIG. 3, the radio protocol architecture between a first communication node (UE or RSU in V2X) and a second communication node (another UE or RSU in V2X) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first communication node and the second communication node via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. Although not described in FIG. 3, the first communication node and the second communication node may comprise several higher layers above the L2 305, such as a network layer (e.g., IP layer) terminated at a P-GW of the network side and an application layer terminated at the other side of the connection (e.g., a peer UE, a server, etc.). The PDCP sublayer 304 provides multiplexing among variable radio bearers and logical channels. The PDCP sublayer 304 also provides a header compression for a higher-layer data packet so as to reduce a radio transmission overhead. The PDCP sublayer 304 provides security by encrypting a packet. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating various radio resources (i.e., resources block) The MAC sublayer 302 is also in charge of HARQ operation (if supported). In the control plane, the radio protocol architecture of the first communication node and the second communication node is almost the same as the radio protocol architecture on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling.

In one embodiment, the radio protocol architecture in FIG. 3 is applicable to the first communication node in the present disclosure.

In one embodiment, the radio protocol architecture in FIG. 3 is applicable to the second communication node in the present disclosure.

In one embodiment, the first information in the present disclosure is generated by the RRC 306.

In one embodiment, the first information in the present disclosure is generated by the MAC 302.

In one embodiment, the first information in the present disclosure is generated by the PHY 301.

In one embodiment, the first radio signal in the present disclosure is generated by the RRC 306.

In one embodiment, the first radio signal in the present disclosure is generated by the MAC 302.

In one embodiment, the first radio signal in the present disclosure is generated by the PHY 301.

In one embodiment, the second information in the present disclosure is generated by the RRC 306.

In one embodiment, the second information in the present disclosure is generated by the MAC 302.

In one embodiment, the second information in the present disclosure is generated by the PHY 301.

In one embodiment, the third information in the present disclosure is generated by the RRC 306.

In one embodiment, the third information in the present disclosure is generated by the MAC 302.

In one embodiment, the third information in the present disclosure is generated by the PHY 301.

Embodiment 4

Figure 4:
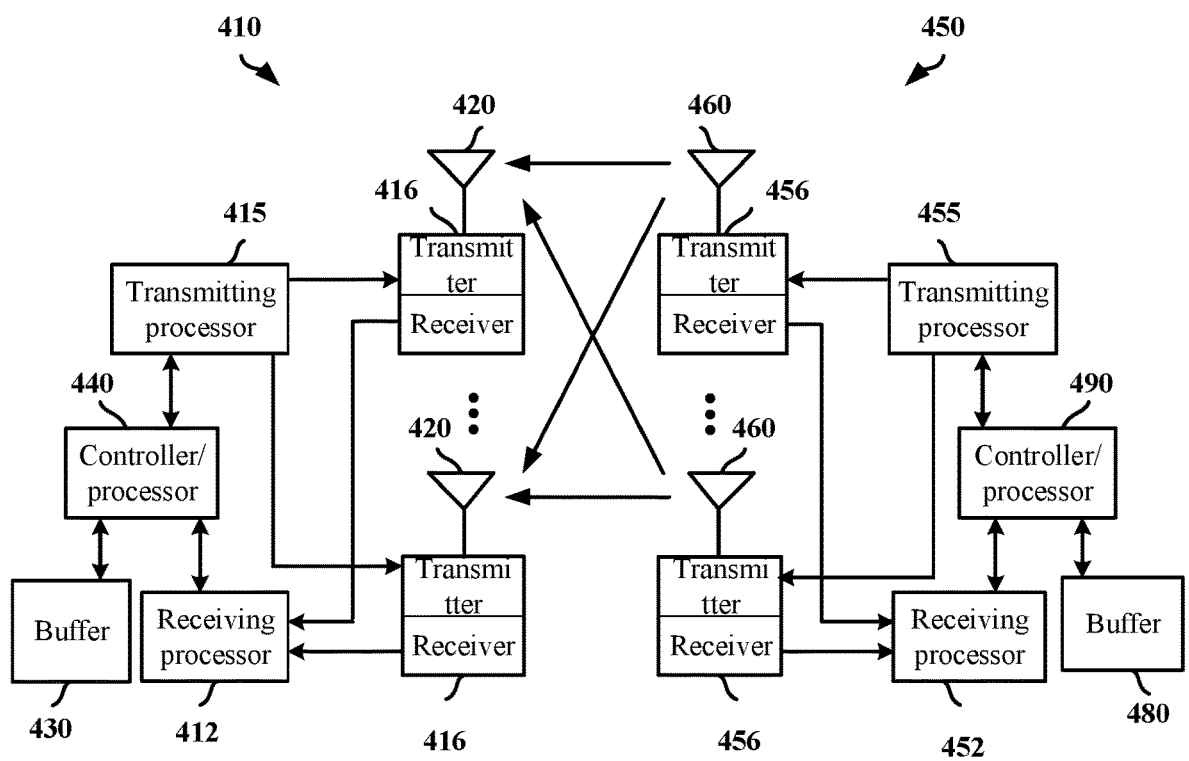
FIG. 4 illustrates a schematic diagram of a first communication node and a second communication node according to one embodiment of the present disclosure.

Embodiment 4 illustrates a schematic diagram of a first communication node and a second communication node in the present disclosure, as shown in FIG. 4.

The first communication node (450) comprises a controller/processor 490, a memory 480, a receiving processor 452, a transmitter/receiver 456, a transmitting processor 455 and a data source 467, wherein the transmitter/receiver 456 comprises an antenna 460. The data source 467 provides a higher-layer packet to the controller/processor 490, the controller/processor 490 provides header compression and decompression, encryption and decryption, packet segmentation and reordering and multiplexing and demultiplexing between a logical channel and a transport channel so as to implement the L2 layer protocols used for the user plane and the control plane. The higher layer packet may comprise data or control information, such as DL-SCH, UL-SCH or SL-SCH. The transmitting processor 455 performs various signal transmitting processing functions used for the L1 layer (that is, PHY), including coding, interleaving, scrambling, modulation, power control/allocation and generation of physical layer control signaling. the receiving processor 452 performs various signal receiving processing functions used for the L1 layer (that is, PHY), including decoding, deinterleaving, descrambling, demodulation, de-precoding and extraction of physical layer control signaling. The transmitter 456 is configured to convert a baseband signal provided by the transmitting processor 455 into a radio frequency (RF) signal to be transmitted via the antenna 460. The receiver 456 converts the RF signal received via the antenna 460 into a baseband signal and provides the baseband signal to the receiving processor 452. The composition in the second communication node device (410) is the same as that in the first-type communication node device 450.

In Sidelink transmission, a higher layer packet (for example, first information, third information and information carried in a first radio signal in the present disclosure) is provided to the controller/processor 490. The controller/processor 490 implements functions of L2/L3 layer. the controller/processor 490 provides header compression, encryption, packet segmentation and reordering, multiplexing between a logical channel and a transport channel, and radio resources allocation based on various priorities. The controller/processor 490 is also in charge of HARQ operation (if supported), retransmission of a lost packet, and a signaling to the second communication node 410, for instance, the first information and third information in the present disclosure is generated in the controller/processor 490. The transmitting processor 455 performs signal processing functions of the L1 layer (that is, PHY), including coding, interleaving, scrambling, modulation, power control/allocation, precoding and physical layer control signaling generation. Generation of physical layer signals carrying the first information, the third information and a first radio signal of the present disclosure is performed in the transmitting processor 455. Modulated signals are divided into parallel streams and each stream is mapped onto corresponding multicarrier subcarriers and/or multicarrier symbols, which are then mapped from the transmitting processor 455 to the antenna 460 via the transmitter 456 to be transmitted in the form of RF signals. At the receiving side, each receiver 416 receives an RF signal via a corresponding antenna 420, each receiver 416 recovers baseband information modulated to the RF carrier and provides the baseband information to the receiving processor 412. The receiving processor 412 provides various signal receiving functions for the L1 layer. The signal receiving processing functions include reception of physical layer signals carrying the first information, the third information and a first radio signal of the present disclosure, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the first communication node 450 on a physical channel, and the data or control signals are later provided to the controller/processor 440. The controller/processor 440 implements the functionality of the L2 layer, the controller/processor 440 interprets information carried by the first information, the third information and the first radio signal of the present disclosure. The controller/processor can be connected to a memory 430 that stores program code and data. The memory 430 may be called a computer readable medium.

In one embodiment, the first communication node 450 comprises at least one processor and at least one memory. The at least one memory comprises computer program codes; the at least one memory and the computer program codes are configured to be used in collaboration with the at least one processor, the first communication node 450 at least transmits first information; herein, for a given SCS, the first communication node assumes that X1 PRB(s) is (are) comprised in frequency-domain resources that can be occupied by the first communication node for transmissions, X1 being a positive integer, and the X1 PRB(s) occupies (occupy) consecutive frequency-domain resources; a position of the X1 PRB(s) in 30) frequency domain is related to at least one of whether the first communication node is in coverage or a synchronization reference source selected by the first communication node; the first information is used to indicate a position of the X1 PRB(s) in frequency domain, and the first information is transmitted via an air interface.

In one embodiment, the first communication node 450 comprises a memory that stores a computer readable instruction program. The computer readable instruction program generates an action when executed by at least one processor. The action includes: transmitting first information; herein, for a given SCS, the first communication node assumes that X1 PRB(s) is (are) comprised in frequency-domain resources that can be occupied by the first communication node for transmissions, X1 being a positive integer, and the X1 PRB(s) occupies (occupy) consecutive frequency-domain resources; a position of the X1 PRB(s) in frequency domain is related to at least one of whether the first communication node is in coverage or a synchronization reference source selected by the first communication node; the first information is used to indicate a position of the X1 PRB(s) in frequency domain, and the first information is transmitted via an air interface.

In one embodiment, the second communication node 410 comprises at least one processor and at least one memory. The at least one memory comprises computer program codes; the at least one memory and the computer program codes are configured to be used in collaboration with the at least one processor. The second communication node 410 at least: receives first information; herein, for a given SCS, the second communication node assumes that X1 PRB(s) is (are) comprised in frequency-domain resources that can be occupied by a transmitter of the first information for transmissions, X1 being a positive integer, and the X1 PRB(s) occupies (occupy) consecutive frequency-domain resources; a position of the X1 PRB(s) in frequency domain is related to at least one of whether the transmitter of the first information is in coverage or a synchronization reference source selected by the transmitter of the first information; the first information is used to indicate a position of the X1 PRB(s) in frequency domain, and the first information is transmitted via an air interface.

In one embodiment, the second communication node 410 comprises a memory that stores a computer readable instruction program. The computer readable instruction program generates an action when executed by at least one processor. The action includes: receiving first information; herein, for a given SCS, the second communication node assumes that X1 PRB(s) is (are) comprised in frequency-domain resources that can be occupied by a transmitter of the first information for transmissions, X1 being a positive integer, and the X1 PRB(s) occupies (occupy) consecutive frequency-domain resources; a position of the X1 PRB(s) in frequency domain is related to at least one of whether the transmitter of the first information is in coverage or a synchronization reference source selected by the transmitter of the first information; the first information is used to indicate a position of the X1 PRB(s) in frequency domain, and the first information is transmitted via an air interface.

In one embodiment, the transmitter 456 (including the antenna 460), the transmitting processor 455 and the controller/processor 490 are to transmit the first information in the present disclosure.

In one embodiment, the transmitter 456 (including the antenna 460), the transmitting processor 455 and the controller/processor 490 are used to transmit the first radio signal in the present disclosure.

In one embodiment, the transmitter 456 (including the antenna 460), the transmitting processor 455 and the controller/processor 490 are to transmit the third information in the present disclosure.

In one embodiment, the receiver 456 (including the antenna 460), the receiving processor 452 and the controller/processor 490 are used to receive the second information in the present disclosure.

In one embodiment, the receiver 416 (including the antenna 420), the receiving processor 412 and the controller/processor 440 are used to receive the first information in the present disclosure.

In one embodiment, the receiver 416 (including the antenna 420), the receiving processor 412 and the controller/processor 440 are used to receive the first radio signal in the present disclosure.

In one embodiment, the receiver 416 (including the antenna 420), the receiving processor 412 and the controller/processor 440 are used to receive the third information in the present disclosure.

Embodiment 5

Figure 5:
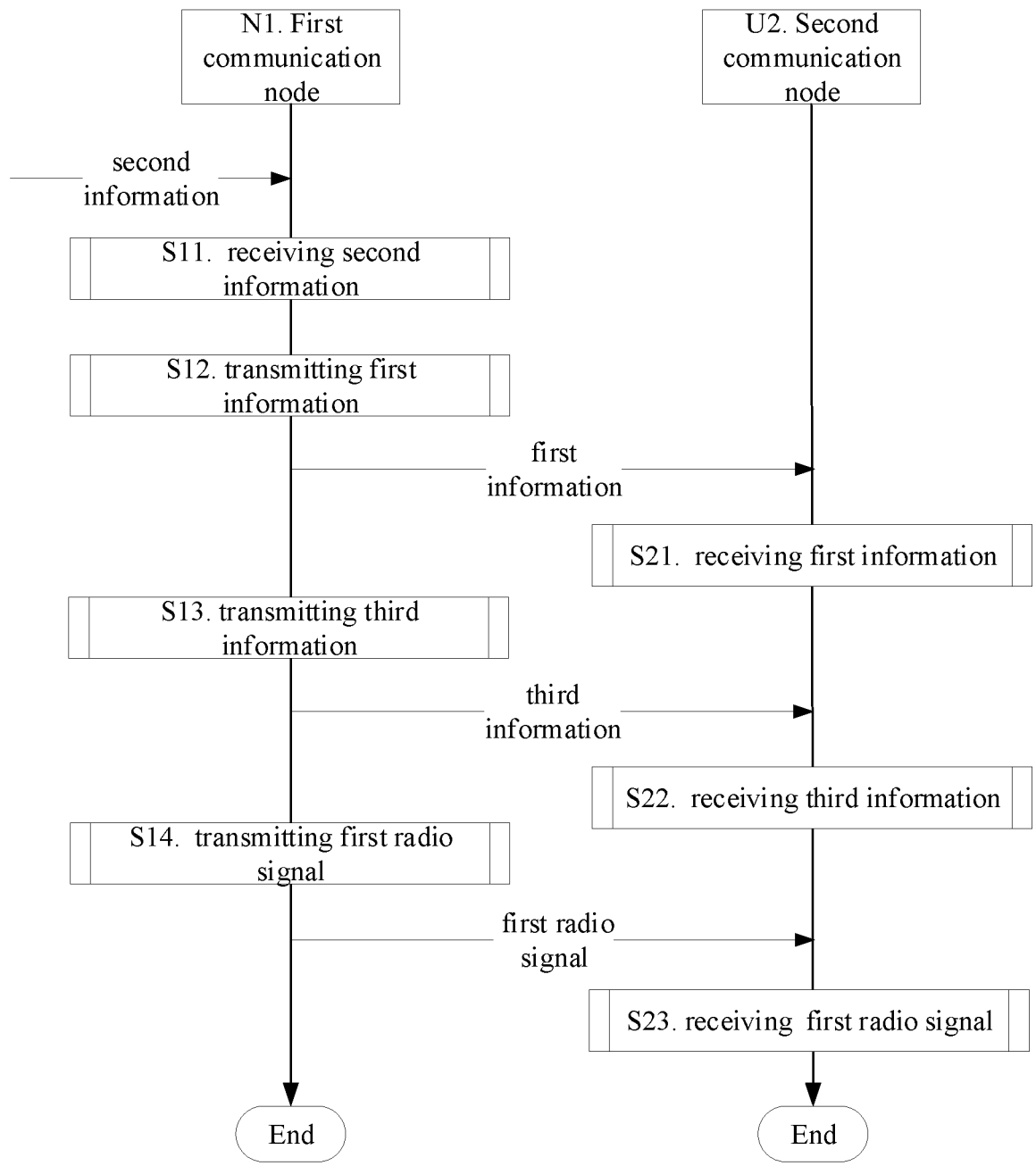
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a first communication node N1 and a second communication node U2 are in communication with each other.

The first communication node N1 receives second information in step S11, transmits first information in step S12, transmits third information in step S13, and transmits a first radio signal in step S14.

The second communication node U2 receives first information in step S21, receives third information in step S22, and receives a first radio signal in step S23.

In Embodiment 5, for a given SCS, the first communication node assumes that X1 PRB(s) is (are) comprised in frequency-domain resources that can be occupied by the first communication node for transmissions, X1 being a positive integer, and the X1 PRB(s) occupies (occupy) consecutive frequency-domain resources; a position of the X1 PRB(s) in frequency domain is related to at least one of whether the first communication node is in coverage or a synchronization reference source selected by the first communication node; the first information is used to indicate a position of the X1 PRB(s) in frequency domain, and the first information is transmitted via an air interface; for an SCS of a subcarrier occupied by the first radio signal, the first communication node assumes that X2 PRB(s) is (are) comprised in frequency-domain resources that can be occupied by the first communication node for transmissions, X2 being a positive integer; there exists (exist) X3 PRB(s) out of the X2 PRB(s), frequency-domain resources occupied by the first radio signal belong to frequency-domain resources occupied by the X3 PRB(s), any of the X3 PRB(s) is one of the X2 PRB(s), X3 being a positive integer not greater than X2; any of the X1 PRB(s) consists of at least one PRB in the X2 PRB(s), or any of the X2 PRB(s) consists of at least one PRB in the X1 PRB(s); the second information is used to determine a first frequency offset, the first frequency offset is equal to 0 kHz or 7.5 kHz, and the first information is used to indicate the first frequency offset; for the given SCS, the first frequency offset is equal to a frequency offset between a subcarrier comprised in the X1 PRB(s) and a subcarrier grid determined by a frequency on a channel raster, or the first frequency offset is equal to a frequency offset between a subcarrier comprised in the X1 PRB(s) and a subcarrier grid determined by a frequency on a synchronization raster; the third information is used to indicate a second frequency offset, and the second frequency offset is equal to 0 kHz or 7.5 kHz; the second frequency offset is a frequency offset between a subcarrier assumed by the first communication node for receptions and a subcarrier grid determined by a frequency on a channel raster, or the second frequency offset is a frequency offset between a subcarrier assumed by the first communication node for receptions and a subcarrier grid determined by a frequency on a synchronization raster.

In one embodiment, the second information being used to determine the first frequency offset refers to that the second information is used by the first communication node to determine the first frequency offset.

In one embodiment, the second information being used to determine the first frequency offset refers to that the second information is used to directly determine the first frequency offset.

In one embodiment, the second information being used to determine the first frequency offset refers to that the second information is used to indirectly determine the first frequency offset.

In one embodiment, the second information being used to determine the first frequency offset refers to that the second information is used to explicitly determine the first frequency offset.

In one embodiment, the second information being used to determine the first frequency offset refers to that the second information is used to implicitly determine the first frequency offset.

In one embodiment, the second information is transmitted via an air interface.

In one embodiment, the second information is transmitted via a Uu interface.

In one embodiment, the second information is transmitted via a radio signal.

In one embodiment, the second information is transmitted from a serving base station of the first communication node to the first communication node in the present disclosure.

In one embodiment, the second information is semi-statically configured.

In one embodiment, the second information is dynamically configured.

In one embodiment, the second information comprises a piece of higher-layer information.

In one embodiment, the second information comprises a piece of physical-layer information.

In one embodiment, the second information is Broadcast.

In one embodiment, the second information is Unicast.

In one embodiment, the second information is Groupcast/Multicast.

In one embodiment, the second information is transmitted through a Physical Downlink Shared Channel (PDSCH).

In one embodiment, the second information is transmitted through a Downlink Shared Channel (DL-SCH).

In one embodiment, the second information is transmitted through a Physical Broadcast Channel (PBCH).

In one embodiment, the second information comprises all or partial IEs in a Master Information Block (MIB).

In one embodiment, the second information comprises all or partial fields in an IE in an MIB.

In one embodiment, the second information comprises all or partial IEs in Remaining System Information (RMSI).

In one embodiment, the second information comprises all or partial fields in an IE in RMSI.

In one embodiment, the second information comprises all or partial IEs in an SIB.

In one embodiment, the second information comprises all or partial fields in an IE in an SIB.

In one embodiment, the first information comprises all or partial fields in Downlink Control Information (DCI).

In one embodiment, the second information comprises all or partial IEs in an RRC signaling.

In one embodiment, the second information comprises all or partial fields in an IE in an RRC signaling.

In one embodiment, the second information comprises a field "frequencyShift7p5khz" in an IE "FrequencyInfoUL" in 3GPP TS38.331 (v15.3.0).

In one embodiment, the second information comprises a field "frequencyShift7p5khz" in an IE "FrequencyInfoUL-SIB" in 3GPP TS38. 331 (v15. 3. 0).

In one embodiment, the third information is transmitted in second time window, and a receiver of the third information can assume that content that carried by the third information is not changed in the second time window; and a time length of the second time window is fixed, or a time length of the second time window is configurable.

In one embodiment, the third information is transmitted in second time window, and a receiver of the third information can assume that content that carried by the third information is valid in the second time window; and a time length of the second time window is fixed, or a time length of the second time window is configurable.

In one embodiment, the third information is transmitted via the air interface.

In one embodiment, the third information is transmitted via a PC5 interface.

In one embodiment, the third information is transmitted through a Sidelink.

In one embodiment, the third information is a piece of physical-layer information.

In one embodiment, the third information is a piece of higher-layer information.

In one embodiment, the third information is transmitted via a physical layer signaling.

In one embodiment, the third information is Broadcast.

In one embodiment, the third information is Unicast.

In one embodiment, the third information is Groupcast/Multicast.

In one embodiment, the third information is transmitted through a PSBCH.

In one embodiment, the third information is transmitted through a SL-BCH.

In one embodiment, the third information carries all or partial IEs in an MIB-SL.

In one embodiment, the third information carries all or partial fields in an IE in an MIB-SL.

In one embodiment, the third information carries all or partial IEs in an MIB-SL-V2X.

In one embodiment, the third information carries all or partial fields in an IE in an MIB-SL-V2X.

In one embodiment, the third information carries all or part of an RMSI-SL.

In one embodiment, the third information is transmitted through a PSCCH.

In one embodiment, the third information is transmitted through a PSSCH.

In one embodiment, the third information comprises all or part of a piece of SCI.

In one embodiment, the third information comprises all or partial fields in a piece of SCI.

In one embodiment, the third information comprises all or part of a piece of SFCI.

In one embodiment, the third information comprises all or part of a higher-layer signaling.

In one embodiment, the third information comprises all or partial IEs in a higher-layer signaling.

In one embodiment, the third information comprises all or partial fields in an IE in a higher-layer signaling.

In one embodiment, the third information comprises all or part of IE in an RRC signaling.

In one embodiment, the third information comprises all or partial fields in an IE in an RRC signaling.

In one embodiment, the third information being used to indicate the second frequency offset refers to: the third information is used by the first communication node in the present disclosure to indicate the second frequency offset.

In one embodiment, the third information being used to indicate the second frequency offset refers to: the third information is used to directly indicate the second frequency offset.

In one embodiment, the third information being used to indicate the second frequency offset refers to: the third information is used to indirectly indicate the second frequency offset.

In one embodiment, the third information being used to indicate the second frequency offset refers to: the third information is used to explicitly indicate the second frequency offset.

In one embodiment, the third information being used to indicate the second frequency offset refers to: the third information is used to implicitly indicate the second frequency offset.

Embodiment 6

Figure 6:
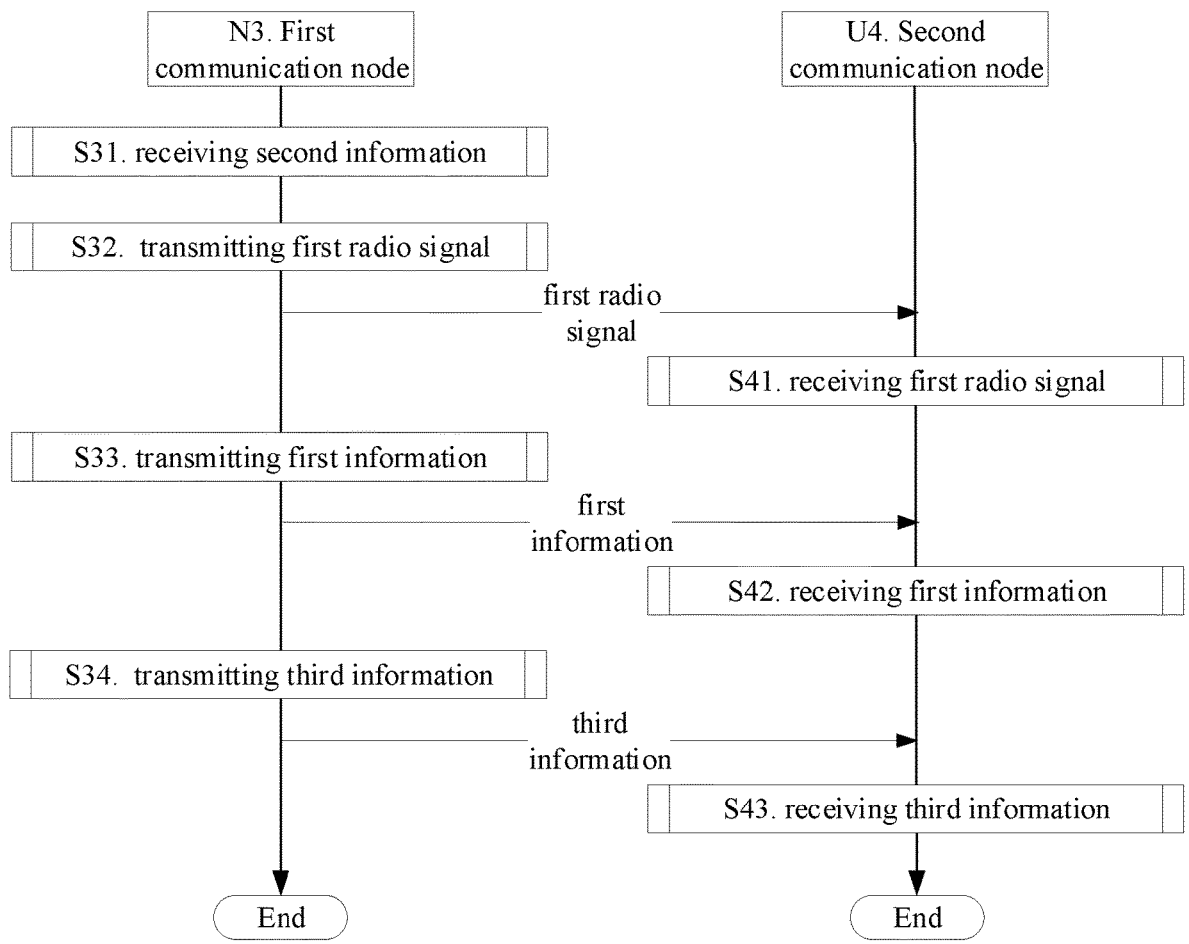
FIG. 6 illustrates a flowchart of radio signal transmission according to another embodiment of the present disclosure.

Embodiment 6 illustrates a flowchart of radio signal transmission according to another embodiment of the present disclosure, as shown in FIG. 6. In FIG. 6, a first communication node N3 and a second communication node U4 are in communication with each other.

The first communication node N3 receives second information in step S31, transmits a first radio signal in step S32, transmits first information in step S33, and transmits third information in step S34.

The second communication node U4 receives a first radio signal in step S41, receives first information in step S42, and receives third information in step S43.

In Embodiment 6, for a given SCS, the first communication node assumes that X1 PRB(s) is (are) comprised in frequency-domain resources that can be occupied by the first communication node for transmissions, X1 being a positive integer, and the X1 PRB(s) occupies (occupy) consecutive frequency-domain resources; a position of the X1 PRB(s) in frequency domain is related to at least one of whether the first communication node is in coverage or a synchronization reference source selected by the first communication node; the first information is used to indicate a position of the X1 PRB(s) in frequency domain, and the first information is transmitted via an air interface; for an SCS of a subcarrier occupied by the first radio signal, the first communication node assumes that X2 PRB(s) is (are) comprised in frequency-domain resources that can be occupied by the first communication node for transmissions, X2 being a positive integer; there exists (exist) X3 PRB(s) out of the X2 PRB(s), frequency-domain resources occupied by the first radio signal belong to frequency-domain resources occupied by the X3 PRB(s), any of the X3 PRB(s) is one of the X2 PRB(s), X3 being a positive integer not greater than X2; any of the X1 PRB(s) consists of at least one PRB in the X2 PRB(s), or any of the X2 PRB(s) consists of at least one PRB in the X1 PRB(s); the second information is used to determine a first frequency offset, the first frequency offset is equal to 0 kHz or 7.5 kHz, and the first information is used to indicate the first frequency offset; for the given SCS, the first frequency offset is equal to a frequency offset between a subcarrier comprised in the X1 PRB(s) and a subcarrier grid determined by a frequency on a channel raster, or the first frequency offset is equal to a frequency offset between a subcarrier comprised in the X1 PRB(s) and a subcarrier grid determined by a frequency on a synchronization raster; the third information is used to indicate a second frequency offset, and the second frequency offset is equal to 0 kHz or 7.5 kHz; the second frequency offset is a frequency offset between a subcarrier assumed by the first communication node for receptions and a subcarrier grid determined by a frequency on a channel raster, or the second frequency offset is a frequency offset between a subcarrier assumed by the first communication node for receptions and a subcarrier grid determined by a frequency on a synchronization raster.

In one embodiment, the first radio signal comprises a synchronization signal.

In one embodiment, the first radio signal comprises an SS/PBCH Block.

In one embodiment, the first radio signal is a Sidelink SS/PBCH Block.

In one embodiment, the second information is transmitted from a higher layer of the first communication node to a physical layer of the first communication node.

In one embodiment, the second information is transferred inside the first communication node.

Embodiment 7

Figure 7:
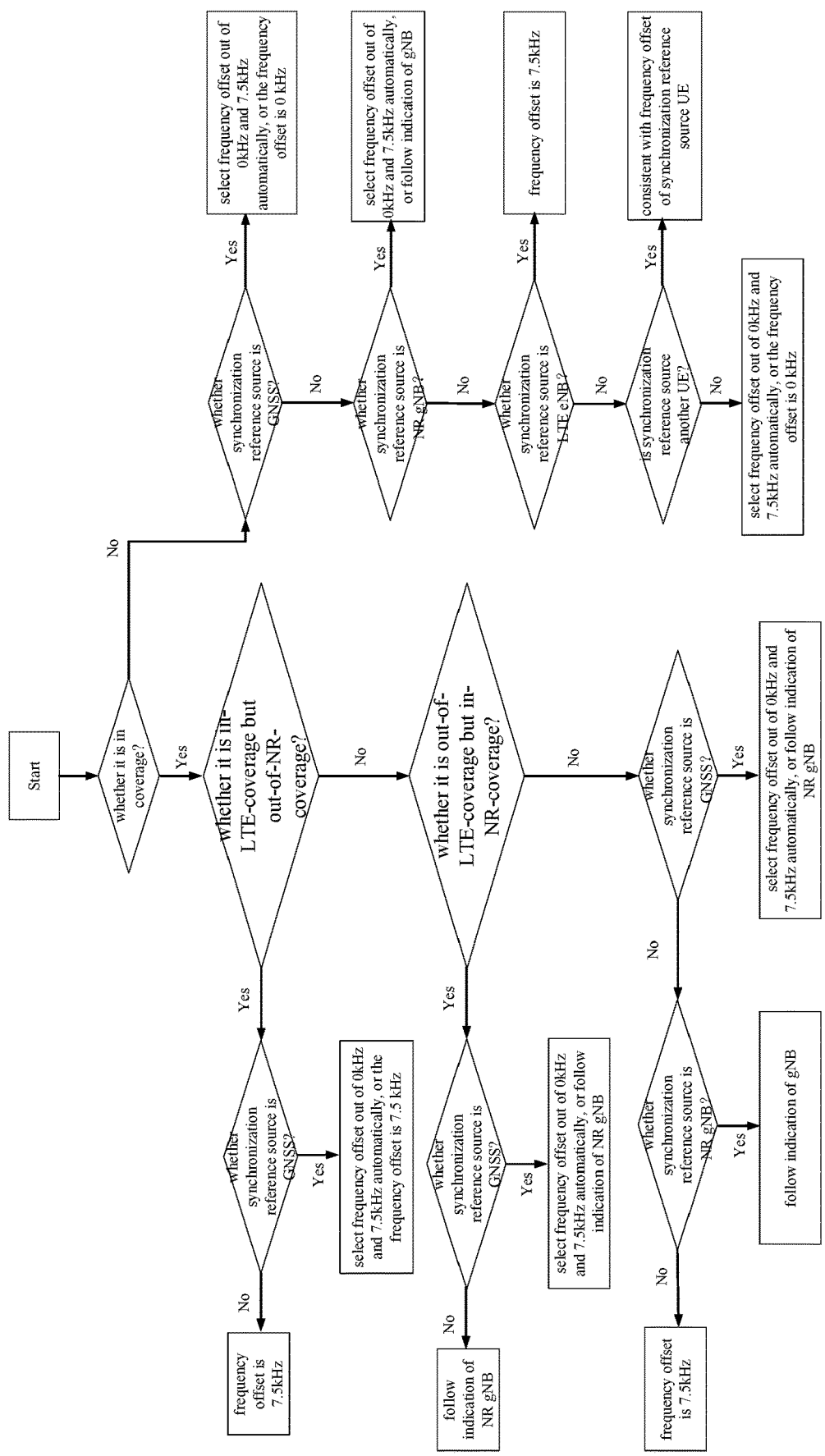
FIG. 7 illustrates a schematic diagram of relations of a position of X1 PRB(s) in frequency domain and whether a first communication node is in coverage, a synchronization reference source selected by the first communication node according to one embodiment of the present disclosure.

Embodiment 7 illustrates a schematic diagram of relations of a position of X1 PRB(s) in frequency domain and whether a first communication node is in coverage, a synchronization reference source selected by a first communication node according to one embodiment of the present disclosure, as shown in FIG. 7. In FIG. 7, each rectangle represents an operation, and each diamond represents a judgment.

In Embodiment 7, for a given SCS, the first communication node assumes that X1 PRB(s) is (are) comprised in frequency-domain resources that can be occupied by the first communication node for transmissions, X1 being a positive integer, and the X1 PRB(s) occupies (occupy) consecutive frequency-domain resources; a position of the X1 PRB(s) in frequency domain is related to at least one of whether the first communication node is in coverage or a synchronization reference source selected by the first communication node.

In one embodiment, a position of the X1 PRB(s) in frequency domain refers to frequency-domain a position of the X1 PRB(s) in a band to which the X1 physical resource(s) belongs (belong).

In one embodiment, a position of the X1 PRB(s) in frequency domain refers to a frequency offset between each of the X1 PRB(s) and a grid of a PRB determined by a channel raster, and the frequency offset is equal to 0 kHz or 7.5 kHz.

In one embodiment, a position of the X1 PRB(s) in frequency domain refers to a frequency offset between each of the X1 PRB(s) and a grid of a PRB determined by an NR-ARFCN, and the frequency offset is equal to 0 kHz or 7.5 kHz.

In one embodiment, a position of the X1 PRB(s) in frequency domain refers to a frequency offset between each of the X1 PRB(s) and a grid of a PRB in an SS/PBCH Block determined by a synchronization raster, and the frequency offset is equal to 0 kHz or 7.5 kHz.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, and the frequency offset is selected by the first communication node itself out of 0 kHz and 7.5 kHz.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, and the frequency offset is selected by the first communication node itself out of 0 kHz and 7.5 kHz.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, and the frequency offset is selected by the first communication node itself out of 0 kHz and 7.5 kHz.

In one embodiment, a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, for the given SCS, each of the X1 PRB(s) is aligned with a grid of a PRB determined by a channel raster.

In one embodiment, a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, for the given SCS, a frequency offset between each of the X1 PRB(s) and a grid of a PRB determined by a channel raster is 0 kHz.

In one embodiment, a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, for the given SCS, each of the X1 PRB(s) is aligned with a grid of a PRB determined by an NR-ARFCN.

In one embodiment, a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, for the given SCS, a frequency offset between each of the X1 PRB(s) and a grid of a PRB determined by an NR-ARFCN is 0 kHz.

In one embodiment, a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, for the given SCS, each of the X1 PRB(s) is aligned with a grid of a PRB in an SS/PBCH Block determined by a synchronization raster.

In one embodiment, a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a GNSS, for the given SCS, a frequency offset between each of the X1 PRB(s) and a grid of a PRB in an SS/PBCH Block determined by a synchronization raster is 0 kHz.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a base station (gNB) of NR, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a base station (gNB) of NR, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a base station (gNB) of NR, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a base station (eNB) of LTE, the frequency offset is selected by the first communication node itself out of 0 kHz and 7.5 kHz, or the frequency offset is equal to 7.5 kHz.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a base station (eNB) of LTE, the frequency offset is selected by the first communication node itself out of 0 kHz and 7.5 kHz, or the frequency offset is equal to 7.5 kHz.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a base station (eNB) of LTE, the frequency offset is selected by the first communication node itself out of 0 kHz and 7.5 kHz, or the frequency offset is equal to 7.5 kHz.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a UE other than the first communication node, the frequency offset is equal to a frequency offset of a UE of a synchronization reference source selected by the first communication node.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a UE other than the first communication node, the frequency offset is equal to a frequency offset of a UE of a synchronization reference source selected by the first communication node.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is out-of-coverage and a synchronization reference source selected by the first communication node is a UE other than the first communication node, the frequency offset is equal to a frequency offset of a UE of a synchronization reference source selected by the first communication node.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is out-of-coverage and the first communication node selects itself as a synchronization reference source, the frequency offset is selected by the first communication node itself, or the frequency offset is equal to 0 kHz.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is out-of-coverage and the first communication node selects itself as a synchronization reference source, the frequency offset is selected by the first communication node itself, or the frequency offset is equal to 0 kHz.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is out-of-coverage and the first communication node selects itself as a synchronization reference source, the frequency offset is selected by the first communication node itself, or the frequency offset is equal to 0 kHz.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is in-LTE-coverage and out-of-NR-coverage and a synchronization reference source selected by the first communication node is a GNSS, the frequency offset is selected by the first communication node itself out of 0 kHz and 7.5 kHz, or the frequency offset is equal to 7.5 kHz.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is in-LTE-coverage but out-of-NR-coverage and a synchronization reference source selected by the first communication node is a GNSS, the frequency offset is selected by the first communication node itself out of 0 kHz and 7.5 kHz, or the frequency offset is equal to 7.5 kHz.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is in-LTE-coverage but out-of-NR-coverage and a synchronization reference source selected by the first communication node is a GNSS, the frequency offset is selected by the first communication node itself out of 0 kHz and 7.5 kHz, or the frequency offset is equal to 7.5 kHz.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is in-LTE-coverage but out-of-NR-coverage and a synchronization reference source selected by the first communication node is a base station (eNB) of LTE, the frequency offset is equal to 7.5 kHz.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is in-LTE-coverage but out-of-NR-coverage and a synchronization reference source selected by the first communication node is a base station (eNB) of LTE, the frequency offset is equal to 7.5 kHz.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is in-LTE-coverage but out-of-NR-coverage and a synchronization reference source selected by the first communication node is a base station (eNB) of LTE, the frequency offset is equal to 7.5 kHz.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is in-NR-coverage but out-of-LTE-coverage (or LTE is not supported) and a synchronization reference source selected by the first communication node is a GNSS, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is in-NR-coverage but out-of-LTE-coverage (or LTE is not supported) and a synchronization reference source selected by the first communication node is a GNSS, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is in-NR-coverage but out-of-LTE-coverage (or LTE is not supported) and a synchronization reference source selected by the first communication node is a GNSS, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is in-NR-coverage but out-of-LTE-coverage (or LTE is not supported) and a synchronization reference source selected by the first communication node is a base station (gNB) of NR, the frequency offset follows indication of a base station (gNB) of NR.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is in-NR-coverage but out-of-LTE-coverage (or LTE is not supported) and a synchronization reference source selected by the first communication node is a base station (gNB) of NR, the frequency offset follows indication of a base station (gNB) of NR.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is in-NR-coverage but out-of-LTE-coverage (or LTE is not supported) and a synchronization reference source selected by the first communication node is a base station (gNB) of NR, the frequency offset follows indication of a base station (gNB) of NR.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a GNSS, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a GNSS, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a GNSS, the frequency offset is selected by the first communication node itself out of 0 kHz and 7.5 kHz, or the frequency offset follows indication of a base station (gNB) of NR.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a base station (gNB) of NR, the frequency offset follows indication of a base station (gNB) of NR.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a base station (gNB) of NR, the frequency offset follows indication of a base station (gNB) of NR.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a base station (gNB) of NR, the frequency offset follows indication of a base station (gNB) of NR.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a base station (eNB) of LTE, the frequency offset is equal to 7.5 kHz.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a base station (eNB) of LTE, the frequency offset is equal to 7.5 kHz.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to at least one of whether the first communication node is in coverage or a synchronization reference source selected by the first communication node includes: when the first communication node is in-NR-coverage and in-LTE-coverage at the same time and a synchronization reference source selected by the first communication node is a base station (eNB) of LTE, the frequency offset is equal to 7.5 kHz.

Embodiment 8

Figure 8:
FIG. 8 illustrates a schematic diagram of relations among X1 PRB(s), X2 PRB(s) and X3 PRB(s) according to one embodiment of the present disclosure.
Figure 8:
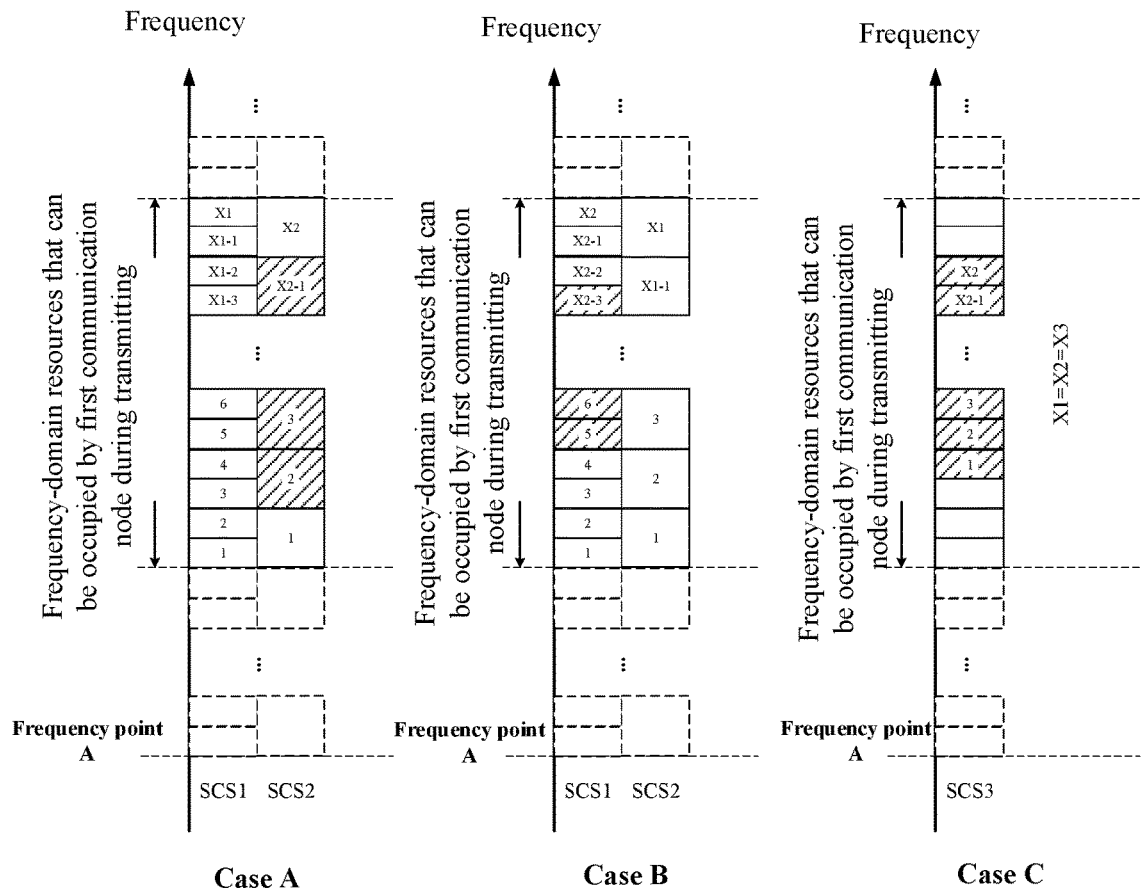

Embodiment 8 illustrates a schematic diagram of relations among X1 PRB(s), X2 PRB(s) and X3 PRB(s) according to one embodiment of the present disclosure, as shown in FIG. 8. In FIG. 8, the vertical axis represents frequency, and each slash-filled rectangle represents one of X3 PRB(s); each dotted-line-framed rectangle represents a corresponding PRB in a grid of a PRB of an SCS, and grids of PRBs of different SCSs are aligned at point A; in case A, each unfilled solid-line-framed rectangle corresponding to an SCS1 represents one of X1 PRB(s), and each solid-line-framed rectangle corresponding to an SCS2 (including each slash-filled rectangle) represents one of X2 PRB(s); in case B, each solid-line-framed rectangle (including each slash-filled rectangle) corresponding to an SCS1 represents one of X2 PRB(s), and each unfilled solid-line-framed rectangle corresponding to an SCS2 represents one of X1 PRB(s); in case C, each solid-line-framed rectangle (including each slash-filled rectangle) represents a PRB that can be comprised in frequency-domain resources that can be occupied by a first communication node for transmissions in the case of an SCS3, X1=X2=X3.

In embodiment 8, for an SCS of a subcarrier occupied by the first radio signal in the present disclosure, the first communication node assumes that X2 PRB(s) is (are) comprised in frequency-domain resources that can be occupied by the first communication node in the present disclosure for transmissions, X2 being a positive integer; there exists (exist) X3 PRB(s) out of the X2 PRB(s), frequency-domain resources occupied by the first radio signal belong to frequency-domain resources occupied by the X3 PRB(s), any of the X3 PRB(s) is one of the X2 PRB(s), X3 being a positive integer not greater than X2; any of the X1 PRB(s) in the present disclosure consists of at least one PRB in the X2 PRB(s), or any of the X2 PRB(s) consists of at least one PRB in the X1 PRB(s).

In one embodiment, the first radio signal comprises a Sidelink Shared Channel (SL-SCH).

In one embodiment, the first radio signal carries SCI.

In one embodiment, the first radio signal carries SFCI.

In one embodiment, the first radio signal comprises a PSSCH.

In one embodiment, the first radio signal comprises a PSCCH.

In one embodiment, the first radio signal can be any physical channel or physical signal transmitted on a Sidelink.

In one embodiment, an SCS of a subcarrier occupied by the first radio signal is equal to the given SCS.

In one embodiment, an SCS of a subcarrier occupied by the first radio signal is not equal to the given SCS.

In one embodiment, an SCS of a subcarrier occupied by the first radio signal is equal to one of 15 kHz, 30 kHz, 60 kHz, 120 kHz or 240 KHz.

In one embodiment, an SCS of a subcarrier occupied by the first radio signal is equal to the given SCS, and the X2 PRB(s) is (are) the X1 PRB(s), the X1 is equal to the X2.

In one embodiment, a structure between the X1 PRB(s) and the X2 PRB(s) conform to a nested structure.

In one embodiment, a structure between a subcarrier comprised in the X1 PRB(s) and a subcarrier comprised in the X2 PRB(s) conform to a nested structure.

In one embodiment, for an SCS of a subcarrier occupied by the first radio signal, the X2 PRB(s) comprises (comprise) PRB(s) in frequency-domain resources occupied by the first communication node for transmissions.

In one embodiment, for an SCS of a subcarrier occupied by the first radio signal, the X2 PRB(s) comprises (comprise) part of PRB(s) in frequency-domain resources occupied by the first communication node for transmissions.

In one embodiment, any of the X2 PRB(s) is aligned with a grid of a PRB divided according to an SCS of a subcarrier occupied by the first radio signal.

In one embodiment, the first radio signal occupies the X3 PRB(s).

In one embodiment, the first radio signal occupies part of frequency-domain resources comprised in the X3 PRB(s).

In one embodiment, the X3 is equal to 20.

In one embodiment, the X3 is equal to 21.

In one embodiment, the X1 is less than 20.

In one embodiment, the X3 is greater than 21.

In one embodiment, the X1 is equal to the X2.

In one embodiment, the X1 is not equal to the X2.

In one embodiment, the X1 is equal to the X2, and the X1 PRB(s) is (are) the X2 PRB(s).

In one embodiment, the X2 is equal to the X3.

In one embodiment, the X2 is not equal to the X3.

In one embodiment, X1=X2=X3, the X1 PRB(s) is (are) the X2 PRB(s), and the X3 PRB(s) is (are) the X1 PRB(s).

In one embodiment, when an SCS of a subcarrier occupied by the first radio signal is not less than the given SCS, any of the X2 PRB(s) consists of at least one PRB of the X1 PRB(s).

In one embodiment, when an SCS of a subcarrier occupied by the first radio signal is less than the given SCS, any of the X1 PRB(s) consists of at least one PRB of the X2 PRB(s).

In one embodiment, when an SCS of a subcarrier occupied by the first radio signal is not less than the given SCS, a boundary of any of the X2 PRB(s) is aligned with a boundary of one of the X1 PRB(s).

In one embodiment, when an SCS of a subcarrier occupied by the first radio signal is less than the given SCS, a boundary of any of the X1 PRB(s) is aligned with a boundary of one of the X2 PRB(s).

Embodiment 9

Figure 9:
FIG. 9 illustrates a schematic diagram of relation(s) between X1 PRB(s) and X PRB(s) according to one embodiment of the present disclosure.
Figure 9:
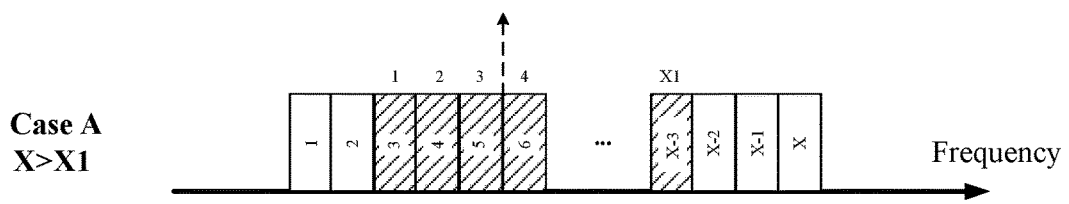
Figure 9:
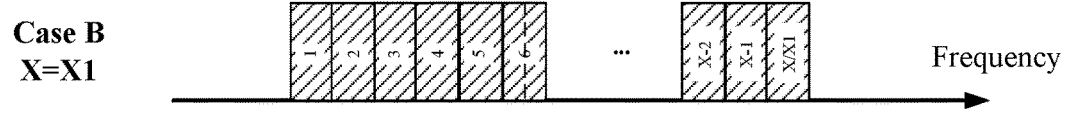

Embodiment 9 illustrates a schematic diagram of a relation between X1 PRB(s) and X PRB(s) according to one embodiment of the present disclosure, as shown in FIG. 9. In FIG. 9, the horizontal axis represents frequency, each slash-filled rectangle represents one of the X1 PRB(s), and each rectangle (including the slash-filled rectangle) represents one of the X PRB(s); in case A, X is greater than X1; in case B, X is equal to X1.

In Embodiment 9, for the given SCS in the present disclosure, the first communication node in the present disclosure assumes that any of the X1 PRB(s) in the present disclosure is one of X PRB(s), X being a positive integer not less than X1, and the X PRB(s) occupies (occupy) consecutive frequency-domain resources; a first reference frequency is a frequency within frequency-domain resources comprised in the X PRB(s), for the given SCS and X, a relative position of the first reference frequency in frequency-domain resources comprised in the X PRB(s) is fixed; the first information in the present disclosure is used to indicate an absolute position of the first reference frequency in frequency domain.

In one embodiment, the X is equal to the X1.

In one embodiment, X=X1=X2=X3.

In one embodiment, X, X1, X2 in the present disclosure and the X3 in the present disclosure are equal.

In one embodiment, the X is greater than the X1.

In one embodiment, the X PRB(s) is (are) X virtual PRB(s) of the first communication node for transmissions.

In one embodiment, the X PRB(s) is (are) X real PRB(s) of the first communication node for transmissions.

In one embodiment, the X PRB(s) is (are) used by the first communication node as a grid for dividing frequency domain.

In one embodiment, the X PRB(s) is (are) used by the first communication node as a frequency-domain position of a channel or a signal for transmissions.

In one embodiment, the X PRB(s) is (are) used by the first communication node as a frequency-domain position of a carrier for transmissions.

In one embodiment, the X PRB(s) is (are) X CRB(s).

In one embodiment, the X PRB(s) is (are) used to determine frequency-domain a position of RF signal, an SS/PBCH Block, and other signals or channels.

In one embodiment, the X PRB(s) occupies (occupy) all frequency-domain resources that can be occupied by the first communication node for transmissions.

In one embodiment, frequency-domain resources that can be occupied by the first communication node for transmissions are frequency-domain resources occupied by the X PRB(s).

In one embodiment, frequency-domain resources that can be occupied by the first communication node for transmissions only comprise frequency-domain resources occupied by the X PRB(s).

In one embodiment, frequency-domain resources that can be occupied by the first communication node for transmissions comprise frequency-domain resources other than frequency-domain resources occupied by the X PRB(s).

In one embodiment, frequency-domain resources that can be occupied by the first communication node for transmissions comprise frequency-domain resources and guard band resources occupied by the X PRB(s).

In one embodiment, frequency-domain resources occupied by the X PRB(s) are occupied by a physical channel or a channel.

In one embodiment, for the given SCS, the X PRB(s) is (are) PRB(s) that can be supported by the first communication node within a largest transmission bandwidth.

In one embodiment, for the given SCS, the X PRB(s) is (are) PRB(s) that can be supported by the first communication node within largest transmission bandwidth configuration.

In one embodiment, for the given SCS, the X PRB(s) is (are) PRB(s) that can be supported by the first communication node in a transmitting carrier.

In one embodiment, for the given SCS, the X PRB(s) is (are) PRB(s) that can be supported by the first communication node within largest transmission bandwidth configuration, and the X is equal to an $N_{RB}$ in 3GPP TS38. 101-1 (V15. 3. 0), table 5. 3. 2-1.

In one embodiment, a structure between the X PRB(s) and a CRB in a carrier to which the X PRB(s) belongs (belong) conforms to a Nested Structure.

In one embodiment, a structure between a subcarrier in the X PRB(s) and a subcarrier in a CRB in a carrier to which the X PRB(s) belongs (belong) conforms to a Nested Structure.

In one embodiment, an SCS of a subcarrier comprised in any of the X PRB(s) is equal to an SCS of a subcarrier occupied by the first radio signal.

In one embodiment, the first reference frequency is measured by MHz.

In one embodiment, the first reference frequency is an absolute frequency value in frequency domain.

In one embodiment, the first reference frequency is a frequency point value in frequency domain.

In one embodiment, the first reference frequency is measured by kHz.

In one embodiment, a corresponding position of the first reference frequency in frequency-domain resources comprised in the X PRB(s) being fixed refers to: the first reference frequency is a center frequency in frequency-domain resources comprised in the X PRB(s).

In one embodiment, a corresponding position of the first reference frequency in frequency-domain resources comprised in the X PRB(s) being fixed refers to: the first reference frequency is a lowest frequency in frequency-domain resources comprised in the X PRB(s).

In one embodiment, a corresponding position of the first reference frequency in frequency-domain resources comprised in the X PRB(s) being fixed refers to: the first reference frequency is a highest frequency in frequency-domain resources comprised in the X PRB(s).

In one embodiment, a corresponding position of the first reference frequency in frequency-domain resources comprised in the X PRB(s) being fixed refers to: a corresponding position of the first reference frequency in frequency-domain resources comprised in the X PRB(s) is pre-defined.

In one embodiment, the first reference frequency is equal to a frequency on a channel raster or a frequency shifting 7.5 kHz on a channel raster.

In one embodiment, the first reference frequency is equal to a frequency identified by an NR-ARFCN or a frequency identified by an NR-ARFCN shifting 7.5 kHz.

In one embodiment, the first reference frequency is equal to a frequency on a synchronization raster or a frequency shifting 7.5 kHz on a synchronization raster.

In one embodiment, a position of the X1 PRB(s) in frequency domain refers to an absolute position of the first reference frequency in frequency domain.

In one embodiment, the first information being used to indicate an absolute position of the first reference frequency in frequency domain refers to: the first information is used by the first communication node to indicate an absolute position of the first reference frequency in frequency domain.

In one embodiment, the first information being used to indicate an absolute position of the first reference frequency in frequency domain refers to: the first information is used to directly indicate an absolute position of the first reference frequency in frequency domain.

In one embodiment, the first information being used to indicate an absolute position of the first reference frequency in frequency domain refers to: the first information is used to indirectly indicate an absolute position of the first reference frequency in frequency domain.

In one embodiment, the first information being used to indicate an absolute position of the first reference frequency in frequency domain refers to: the first information is used to explicitly indicate an absolute position of the first reference frequency in frequency domain.

In one embodiment, the first information being used to indicate an absolute position of the first reference frequency in frequency domain refers to: the first information is used to implicitly indicate an absolute position of the first reference frequency in frequency domain.

In one embodiment, the first information being used to indicate an absolute position of the first reference frequency in frequency domain refers to: the first information is used to indicate a frequency offset of a frequency on the first reference frequency and a channel raster out of 0 kHz and 7.5 kHz.

In one embodiment, the first information being used to indicate an absolute position of the first reference frequency in frequency domain refers to: the first information is used to indicate a frequency offset of a frequency on the first reference frequency and a synchronization raster out of 0 kHz and 7.5 kHz.

In one embodiment, the first information being used to indicate an absolute position of the first reference frequency in frequency domain refers to: the first information is used to indicate a frequency offset of a frequency identified by the first reference frequency and an NR-ARFCN out of 0 kHz and 7.5 kHz.

Embodiment 10

Figures 10, 11:
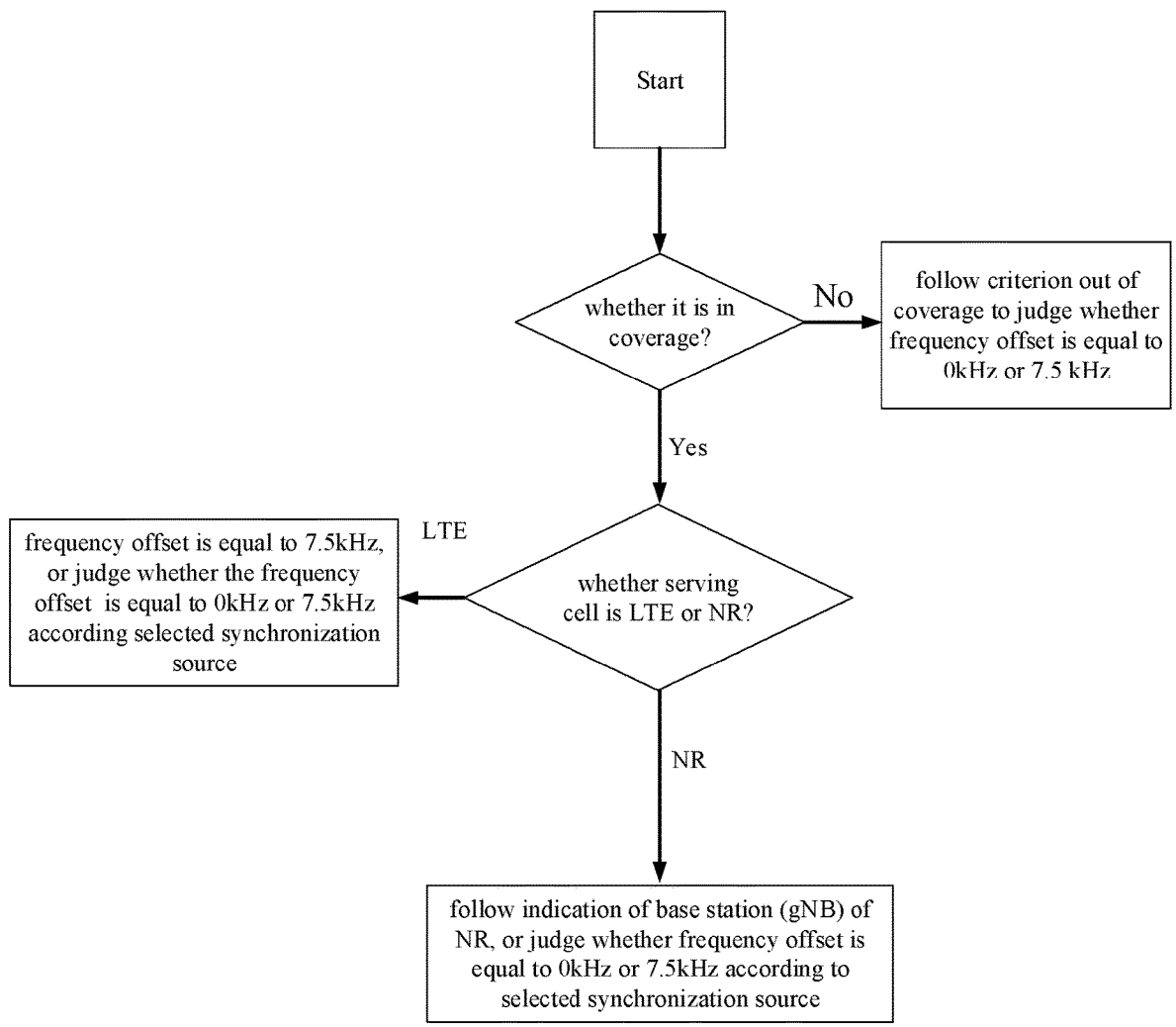
FIG. 10 illustrates a schematic diagram of a first reference frequency according to one embodiment of the present disclosure.
FIG. 11 illustrates a schematic diagram of a relation between a position of X1 PRB(s) in frequency domain and a type of a serving cell of a first communication node according to one embodiment of the present disclosure.

Embodiment 10 illustrates a schematic diagram of a first reference frequency according to one embodiment of the present disclosure, as shown in FIG. 10. In FIG. 10, from the left, the second column and the third column respectively represent an index of a PRB to which a first reference frequency belongs and an index of a subcarrier when X is an even number and when X is an odd number, wherein indexes of subcarriers are indexes of subcarriers within a PRB to which they belong starting from 0 according to frequency in an ascending order.

In Embodiment 10, the X PRB(s) is (are) indexed from 0 to X−1 according to frequency in an ascending order; when X is an even number, a PRB with an index value equal to Y1 in the X PRB(s) is a first PRB, Y1 is equal to half of X, the first reference frequency is equal to a characteristic frequency of a subcarrier with a lowest frequency belonging to the first PRB; when X is an odd number, a PRB with an index value equal to Y2 in the X PRB(s) is a second PRB, the first reference frequency is equal to a characteristic frequency of a 7-th subcarrier arranged according to frequency in an ascending order belonging to the second PRB, Y2 is equal to half of a difference of X minus 1.

In one embodiment, when the X is an even number, a remainder of the X modulo 2 is equal to 0.

In one embodiment, when the X is an odd number, a remainder of the X modulo 2 is equal to 1.

In one embodiment, a characteristic frequency of a subcarrier is a center frequency of frequency-domain resources occupied by the subcarrier.

In one embodiment, a characteristic frequency of a subcarrier is a lowest frequency of frequency-domain resources occupied by the subcarrier.

In one embodiment, a characteristic frequency of a subcarrier is a highest frequency of frequency-domain resources occupied by the subcarrier.

In one embodiment, subcarriers in the first PRB are indexed from 0 to 11 according to frequency in an ascending order, and a subcarrier with a lowest frequency belonging to the first PRB refers to a subcarrier with an index value of 0 in the first PRB.

In one embodiment, subcarriers in the second PRB are indexed from 0 to 11 according to frequency in an ascending order, and a 7-th subcarrier belonging to the second PRB according to frequency in an ascending order refers to a subcarrier with an index value of 6 in the second PRB.

Embodiment 11

Embodiment 11 illustrates a schematic diagram of a relation between a position of X1 PRB(s) in frequency domain and a type of a serving cell of a first communication node according to one embodiment of the present disclosure, as shown in FIG. 11. In FIG. 11, each rectangle represents an operation, and each diamond represents a judgment.

In Embodiment 11, when the first communication node in the present disclosure is in coverage, a position of the X1 PRB(s) in frequency domain in the present disclosure is related to a type of a serving cell of the first communication node.

In one embodiment, the first information comprises information indicating a type of serving cell of the first communication node.

In one embodiment, a serving cell of the first communication node is a serving cell of the first communication node in an RRC_CONNECTED state.

In one embodiment, a serving cell of the first communication node is a serving cell of the first communication node in an RRC_IDLE state.

In one embodiment, a serving cell of the first communication node is a serving cell of the first communication node in an RRC_INACTIVE state.

In one embodiment, a serving cell of the first communication node is a Camp-on Cell of the first communication node in an RRC_IDLE state.

In one embodiment, a type of a serving cell of the first communication node is one of an LTE serving cell and an NR serving cell.

In one embodiment, when the first communication node is in-LTE-coverage but out-of-NR-coverage, a type of a serving cell of the first communication node is a serving cell of LTE.

In one embodiment, when the first communication node is out-of-LTE-coverage but in-NR-coverage, a type of a serving cell of the first communication node is a serving cell of NR.

In one embodiment, when the first communication node is in-LTE-coverage and in-NR-coverage, a type of a serving cell of the first communication node is selected according to a fixed rule.

In one embodiment, when the first communication node is in-LTE-coverage and in-NR-coverage, a type of a serving cell of the first communication node is selected based on a comparison of Reference Signal Received Power (RSRP) of a serving cell of LTE and RSRP of a serving cell of NR.

In one embodiment, when the first communication node is in-LTE-coverage and in-NR-coverage, a type of a serving cell of the first communication node is selected based on a comparison of Reference Signal Received Quality (RSRQ) of a serving cell of LTE and RSRQ of a serving cell of NR.

In one embodiment, a position of the X1 PRB(s) in frequency domain being related to a type of a serving cell of the first communication node refers to: a position of the X1 PRB(s) in frequency domain has a conditional relation with a type of a serving cell of the first communication node.

In one embodiment, a position of the X1 PRB(s) in frequency domain being related to a type of a serving cell of the first communication node refers to: a position of the X1 PRB(s) in frequency domain has a mapping relation with a type of a serving cell of the first communication node.

In one embodiment, a position of the X1 PRB(s) in frequency domain being related to a type of a serving cell of the first communication node refers to: a type of a serving cell of the first communication node is used to determine a position of the X1 PRB(s) in frequency domain.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to a type of a serving cell of the first communication includes: when the first communication node is in-coverage and a serving cell of the first communication node is a LTE cell, the frequency offset is equal to 7.5 kHz, or whether the frequency offset is equal to 0 kHz or 7.5 kHz is judged according to a synchronization source selected by the first communication node.

In one embodiment, a position of the X1 PRB(s) in frequency domain refers to: a frequency offset between each of the X1 PRB(s) and a grid of a PRB determined by an NR-ARFCN; a position of the X1 PRB(s) in frequency domain being related to a type of a serving cell of the first communication includes: when the first communication node is in-coverage and a serving cell of the first communication node is a LTE cell, the frequency offset is equal to 7.5 kHz, or whether the frequency offset is equal to 0 kHz or 7.5 kHz is judged according to a synchronization source selected by the first communication node.

In one embodiment, a position of the X1 PRB(s) in frequency domain refers to: a frequency offset between each of the X1 PRB(s) and a grid of a PRB in an SS/PBCH Block determined by a synchronization raster; a position of the X1 PRB(s) in frequency domain being related to a type of a serving cell of the first communication includes: when the first communication node is in-coverage and a serving cell of the first communication node is a LTE cell, the frequency offset is equal to 7.5 kHz, or whether the frequency offset is equal to 0 kHz or 7.5 kHz is judged according to a synchronization source selected by the first communication node.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to a type of a serving cell of the first communication includes: when the first communication node is in-coverage and a serving cell of the first communication node is an NR cell, the frequency offset follows indication of a base station (gNB) of NR, or whether the frequency offset is equal to 0 kHz or 7.5 kHz is judged according to a synchronization source selected by the first communication node.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to a type of a serving cell of the first communication includes: when the first communication node is in-coverage and a serving cell of the first communication node is an NR cell, the frequency offset follows indication of a base station (gNB) of NR, or whether the frequency offset is equal to 0 kHz or 7.5 kHz is judged according to a synchronization source selected by the first communication node.

In one embodiment, a position of the X1 PRB(s) in frequency domain refers to a frequency offset between each of the X1 PRB(s) and a grid of a PRB in an SS/PBCH Block determined by a synchronization raster; a position of the X1

PRB(s) in frequency domain being related to a type of a serving cell of the first communication includes: when the first communication node is in-coverage and a serving cell of the first communication node is an NR cell, the frequency offset follows indication of a base station (gNB) of NR, or whether the frequency offset is equal to 0 kHz or 7.5 kHz is judged according to a synchronization source selected by the first communication node.

Embodiment 12

Figure 12:
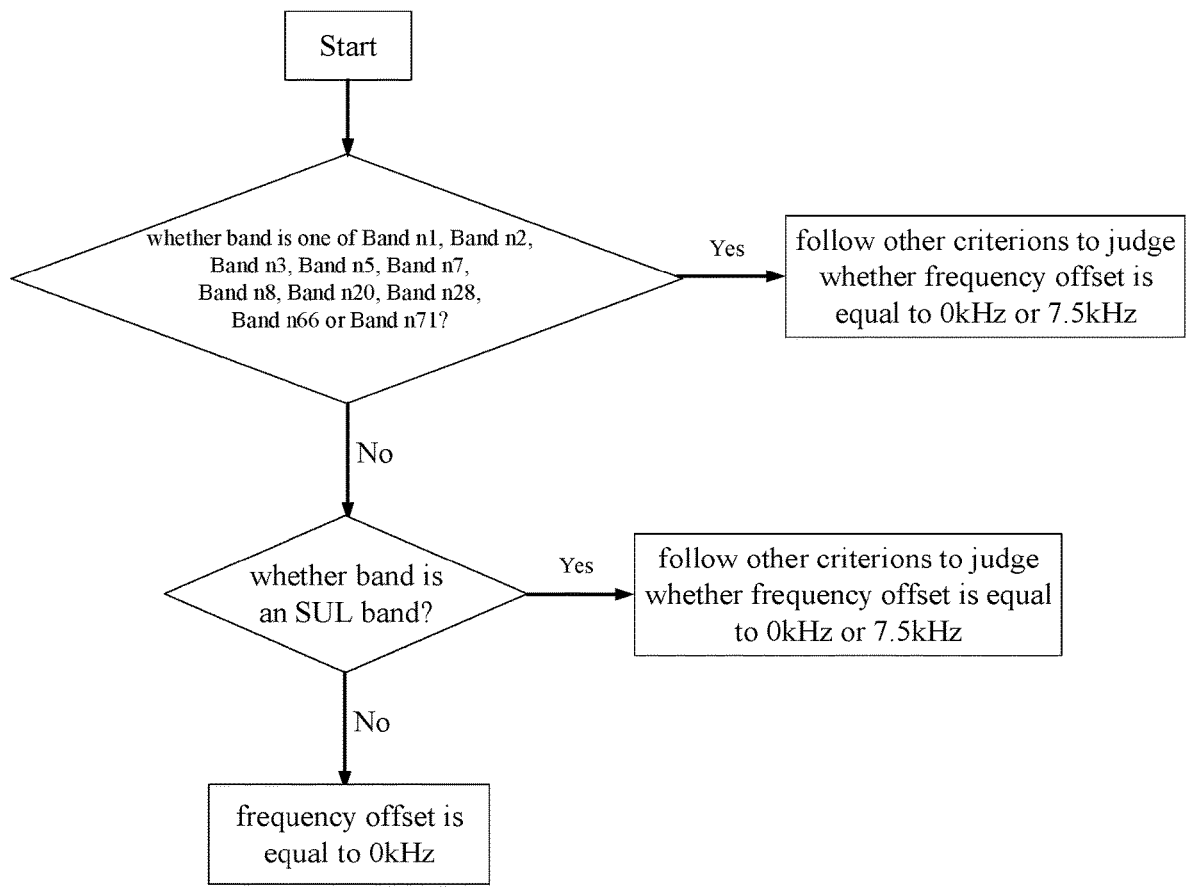
FIG. 12 illustrates a schematic diagram of a relation of a position of X1 PRB(s) in frequency domain and a position of a band to which X1 PRB(s) belongs (belong) in frequency domain according to one embodiment of the present disclosure.

Embodiment 12 illustrates a schematic diagram of a relation of a position of X1 PRB(s) in frequency domain and a position of a band to which X1 PRB(s) belongs (belong) in frequency domain according to one embodiment of the present disclosure, as shown in FIG. 12. In FIG. 12, each rectangle represents an operation, and each diamond represents a judgment.

In Embodiment 12, a position of the X1 PRB(s) in the present disclosure in frequency domain is related to a position of a band to which the X1 PRB(s) belongs (belong) in frequency domain.

In one embodiment, a band to which the X1 PRB(s) belongs (belong) includes a number of a band to which the X1 PRB(s) belongs (belong).

In one embodiment, a band to which the X1 PRB(s) belongs (belong) includes an index of a band to which the X1 PRB(s) belongs (belong).

In one embodiment, a band to which the X1 PRB(s) belongs (belong) includes a type of a band to which the X1 PRB(s) belongs (belong) (whether it is a Supplemental Uplink (SUL) band).

In one embodiment, a position of the X1 PRB(s) in frequency domain refers to a frequency offset between each of the X1 PRB(s) and a grid of a PRB determined by a channel raster; a position of the X1 PRB(s) in frequency domain being related to a position of a band to which the X1 PRB(s) belongs (belong) in frequency domain includes: when an index of a band to which the X1 PRB(s) belongs (belong) is one of n1, n2, n3, n5, n7, n8, n20, n28, n66 or n71 defined in 3GPP TS38. 101 (V15. 0. 0) or a band to which the X1 PRB(s) belongs (belong) is an SUL band, the frequency offset follows an indication of a base station (gNB), or whether the frequency offset is equal to 0 kHz or 7.5 kHz is judged according to at least one of whether the first communication node is in-coverage, a synchronization source selected by the first communication node or a serving cell type of the first communication node.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to a position of a band to which the X1 PRB(s) belongs (belong) in frequency domain includes: when an index of a band to which the X1 PRB(s) belongs (belong) is one of n1, n2, n3, n5, n7, n8, n20, n28, n66 or n71 defined in 3GPP TS38. 101 (V15. 0. 0) or a band to which the X1 PRB(s) belongs (belong) is an SUL band, the frequency offset follows an indication of a base station (gNB), or whether the frequency offset is equal to 0 kHz or 7.5 kHz is judged according to at least one of whether the first communication node is in-coverage, a synchronization source selected by the first communication node or a serving cell type of the first communication node.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to a position of a band to which the X1 PRB(s) belongs (belong) in frequency domain includes: when an index of a band to which the X1 PRB(s) belongs (belong) is one of n1, n2, n3, n5, n7, n8, n20, n28, n66 or n71 defined in 3GPP TS38. 101 (V15. 0. 0) or a band to which the X1 PRB(s) belongs (belong) is an SUL band, the frequency offset follows an indication of a base station (gNB), or whether the frequency offset is equal to 0 kHz or 7.5 kHz is judged according to at least one of whether the first communication node is in-coverage, a synchronization source selected by the first communication node or a serving cell type of the first communication node.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to a position of a band to which the X1 PRB(s) belongs (belong) in frequency domain includes: when an index of a band to which the X1 PRB(s) belongs (belong) is an index other than n1, n2, n3, n5, n7, n8, n20, n28, n66 and n71 defined in 3GPP TS38. 101 (V15. 0. 0) and a band to which the X1 PRB(s) belongs (belong) is not an SUL band, the frequency offset is equal to 0 kHz.

In one embodiment, a position of the X1 PRB(s) in the frequency domain refers to a frequency offset between each of the X1 PRB(s) and a grid of a PRB determined by an NR-ARFCN; a position of the X1 PRB(s) in frequency domain being related to a position of a band to which the X1 PRB(s) belongs (belong) in frequency domain includes: when an index of a band to which the X1 PRB(s) belongs (belong) is an index other than n1, n2, n3, n5, n7, n8, n20, n28, n66 and n71 defined in 3GPP TS38. 101 (V15. 0. 0) and a band to which the X1 PRB(s) belongs (belong) is not an SUL band, the frequency offset is equal to 0 kHz.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to a position of a band to which the X1 PRB(s) belongs (belong) in frequency domain includes: when an index of a band to which the X1 PRB(s) belongs (belong) is an index other than n1, n2, n3, n5, n7, n8, n20, n28, n66 and n71 defined in 3GPP TS38. 101 (V15. 0. 0) and a band to which the X1 PRB(s) belongs (belong) is not an SUL band, the frequency offset is equal to 0 kHz.

Embodiment 13

Figure 13:
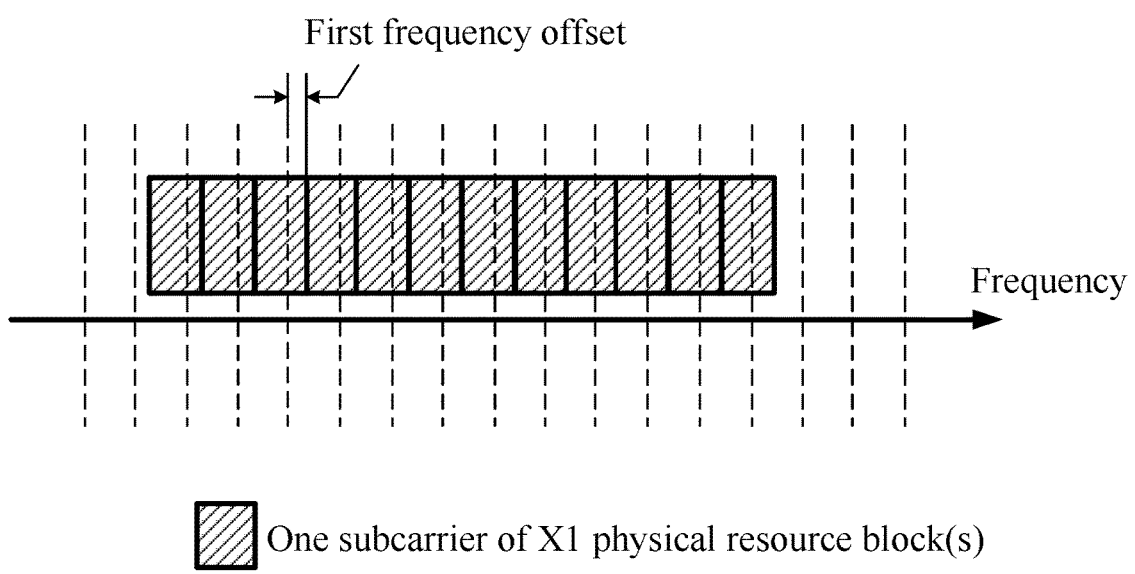
FIG. 13 illustrates a schematic diagram of a first frequency offset according to one embodiment of the present disclosure.

Embodiment 13 illustrates a schematic diagram of a first frequency offset according to one embodiment of the present disclosure, as shown in FIG. 13. In FIG. 13, the horizontal axis represents frequency, the dotted lines of equal length represent subcarrier grids determined by a frequency on a channel raster or subcarrier grids determined by a frequency on a synchronization raster, and each slash-filled rectangle represents a subcarrier in X1 PRB(s).

In Embodiment 13, the first frequency offset in the present disclosure is equal to 0 kHz or 7.5 kHz; for the given SCS in the present disclosure, the first frequency offset is equal to a frequency offset between a subcarrier comprised in the X1 PRB(s) in the present disclosure and a subcarrier grid determined by a frequency on a channel raster, or the first frequency offset is equal to a frequency offset between a subcarrier comprised in the X1 PRB(s) and a subcarrier grid determined by a frequency on a synchronization raster.

In one embodiment, a subcarrier grid determined by a frequency on a channel raster refers to: a frequency on a channel raster is equal to a characteristic frequency of a subcarrier in the subcarrier grid, and the subcarrier grid is a frequency-domain grid in a resource grid for the given SCS in 3GPP TS38. 211 (V15. 3. 0), section 4. 2. 2.

In one embodiment, a subcarrier grid determined by a frequency on a channel raster refers to: a frequency identified by an NR-ARFCN is equal to a characteristic frequency of a subcarrier in the subcarrier grid, and the subcarrier grid is a frequency-domain grid in a resource grid for the given SCS in 3GPP TS38. 211 (V15. 3. 0), section 4. 2. 2.

In one embodiment, the first frequency offset being equal to a frequency offset between a subcarrier comprised in the X1 PRB(s) and a subcarrier grid determined by a frequency on a channel raster refers to: the first frequency offset is equal to a minimum value of a difference of a characteristic frequency between any subcarrier comprised in the X1 PRB(s) and any subcarrier in a subcarrier grid determined by a frequency on a channel raster.

In one embodiment, the first frequency offset being equal to a frequency offset between a subcarrier comprised in the X1 PRB(s) and a subcarrier grid determined by a frequency on a channel raster refers to: the first frequency offset is equal to a frequency offset between the first reference frequency in the present disclosure and a frequency on a Global Frequency Channel Raster.

In one embodiment, the first frequency offset being equal to a frequency offset between a subcarrier comprised in the X1 PRB(s) and a subcarrier grid determined by a frequency on a channel raster refers to: the first frequency offset is equal to a frequency offset between the first reference frequency in the present disclosure and a frequency on a channel raster within a band to which the X1 PRB(s) belongs (belong) in frequency domain.

In one embodiment, the first frequency offset being equal to a frequency offset between a subcarrier comprised in the X1 PRB(s) and a subcarrier grid determined by a frequency on a channel raster refers to: the first frequency offset is equal to a frequency offset between the first reference frequency in the present disclosure and a frequency identified by an NR-ARFCN.

In one embodiment, the first frequency offset being equal to a frequency offset between a subcarrier comprised in the X1 PRB(s) and a subcarrier grid determined by a frequency on a channel raster refers to: the first frequency offset is equal to a frequency offset between the first reference frequency in the present disclosure and a frequency identified by an NR-ARFCN applicable within a band to which the X1 PRB(s) belongs (belong) in frequency domain.

In one embodiment, a subcarrier grid determined by a frequency on a synchronization raster refers to: a frequency on a synchronization raster is equal to a characteristic frequency of a subcarrier in the subcarrier grid, and the subcarrier grid is a frequency-domain grid in a resource grid for the given SCS in 3GPP TS38. 211 (V15. 3. 0), section 4. 2. 2.

In one embodiment, a frequency offset between a subcarrier comprised in the X1 PRB(s) and a subcarrier grid determined by a frequency on a synchronization raster refers to: the first frequency offset is equal to a minimum value of a difference of a characteristic frequency between any subcarrier comprised in the X1 PRB(s) and any subcarrier in a subcarrier grid determined by a frequency on a synchronization raster.

In one embodiment, a frequency offset between a subcarrier comprised in the X1 PRB(s) and a subcarrier grid determined by a frequency on a synchronization raster refers to: the first frequency offset is equal to a frequency offset between the first reference frequency in the present disclosure and a frequency on a synchronization raster.

Embodiment 14

Figure 14:
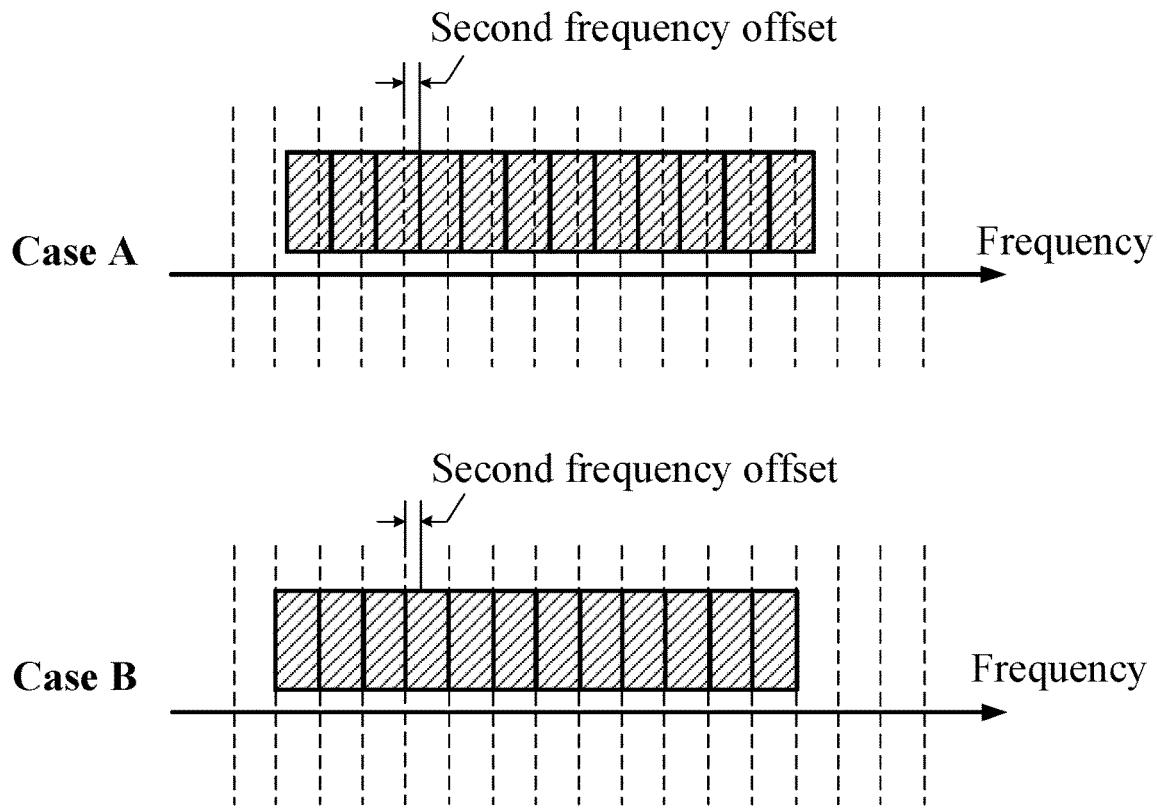
FIG. 14 illustrates a schematic diagram of a second frequency offset according to one embodiment of the present disclosure.

Embodiment 14 illustrates a schematic diagram of a second frequency offset according to one embodiment of the present disclosure, as shown in FIG. 14. In FIG. 14, the horizontal axis represents frequency, the dotted lines of equal length represent subcarrier grids determined by a frequency on a channel raster or subcarrier grids determined by a frequency on a synchronization raster, and each slash-filled rectangle represents a subcarrier occupied by a channel/signal received by a first communication node; in case A, a frequency offset of a subcarrier occupied by a channel/signal received by the first communication node and a subcarrier grid determined by a channel raster or a synchronization raster is equal to a second frequency offset; in case B, a subcarrier occupied by a channel/signal received by the first communication node is aligned with a subcarrier grid determined by a channel raster or a synchronization raster (a frequency offset is not equal to a second frequency offset).

In Embodiment 14, the third information in the present disclosure is used to indicate a second frequency offset, and the second frequency offset is equal to 0 kHz or 7.5 kHz; the second frequency offset is a frequency offset between a subcarrier assumed by the first communication node for receptions in the present disclosure and a subcarrier grid determined by a frequency on a channel raster, or the second frequency offset is a frequency offset between a subcarrier assumed by the first communication node for receptions and a subcarrier grid determined by a frequency on a synchronization raster.

In one embodiment, the second frequency offset is related to a frequency-domain position of a channel assumed to be received by the first communication node.

In one embodiment, the second frequency offset is related to interference assumed by the first communication node for receptions.

In one embodiment, the second frequency offset is not necessarily a real frequency offset of the first communication for receptions.

In one embodiment, a transmitter of a signal or channel received by the first communication node selects the second frequency offset by itself.

In one embodiment, a transmitter of a signal or channel received by the first communication node determines the second frequency offset according to an indication of the third information.

In one embodiment, the second frequency offset being equal to a frequency offset between a subcarrier assumed by the first communication node for receptions and a subcarrier grid determined by a frequency on a channel raster refers to: a minimum value of a difference of a characteristic frequency between any subcarrier assumed by the first communication node for receptions and any subcarrier in a subcarrier grid determined by a frequency on a channel raster.

In one embodiment, the second frequency offset being equal to a frequency offset between a subcarrier assumed by the first communication node for receptions and a subcarrier grid determined by a frequency on a channel raster refers to: a minimum value of a difference of a characteristic frequency between any subcarrier assumed by the first communication node for receptions and any subcarrier in a subcarrier grid determined by a frequency identified by an NR-ARFCN.

In one embodiment, the second frequency offset being equal to a frequency offset between a subcarrier assumed by the first communication node for receptions and a subcarrier grid determined by a frequency on a synchronization raster refers to: a minimum value of a difference of a characteristic frequency between any subcarrier assumed by the first communication node for receptions and any subcarrier in a subcarrier grid determined by a frequency on a synchronization raster.

Embodiment 15

Figure 15:
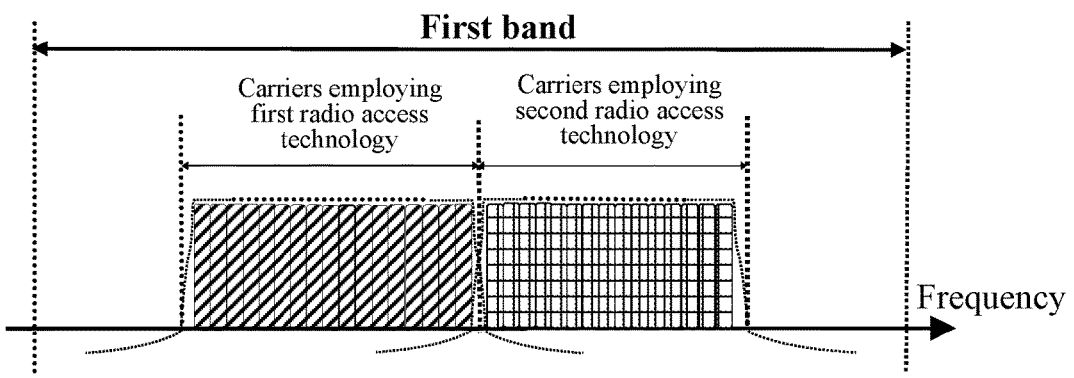
FIG. 15 illustrates a schematic diagram of a first RAT and a second RAT according to one embodiment of the present disclosure.

Embodiment 15 illustrates a schematic diagram of a first RAT and a second RAT according to one embodiment of the present disclosure, as shown in FIG. 15. In FIG. 15, the horizontal axis represents frequency, frequency-domain resources occupied by slash-filled rectangles belong to carriers adopting a first RAT, and frequency-domain resources occupied by reticle-filled rectangles belong to carriers adopting a second RAT.

In embodiment 15, a carrier to which the X1 PRB(s) in the present disclosure belongs (belong) in frequency domain is a first carrier, a band to which the first carrier belongs is a first band, an RAT employed in transmission in the first carrier is a first RAT, a position of the X1 PRB(s) in frequency domain is related to whether there exist frequency-domain resources in the first band that can be used for radio signal transmission employing a second RAT, and the second RAT is an RAT other than the first RAT.

In one embodiment, the first information comprises information indicating whether there exist frequency-domain resources in the first band that can be used by the first communication node for radio signal transmission employing a second RAT.

In one embodiment, the first RAT is NR.

In one embodiment, the second RAT is LTE.

In one embodiment, a lowest frequency of a carrier adopting the first RAT is greater than a highest frequency of a carrier adopting the second RAT.

In one embodiment, a lowest frequency of a carrier adopting the second RAT is greater than a highest frequency of a carrier adopting the first RAT.

In one embodiment, the first communication node supports the first RAT and the second RAT simultaneously.

In one embodiment, the first communication node simultaneously supports Sidelink transmission based on the first RAT and Sidelink transmission based on the second RAT.

In one embodiment, Sidelink transmission based on the first RAT and Sidelink transmission based on the second RAT are Time Division Multiplexing (TDM).

In one embodiment, Sidelink transmission based on the first RAT and Sidelink transmission based on the second RAT are Frequency Division Multiplexing (FDM).

In one embodiment, Sidelink transmission based on the first RAT and Sidelink transmission based on the second RAT occupy different frequency-domain resources.

In one embodiment, Sidelink transmission based on the first RAT and Sidelink transmission based on the second RAT may occupy same frequency-domain resources.

In one embodiment, the first band is one of n1, n2, n3, n5, n7, n8, n20, n28, n66 or n71 defined in 3GPP TS38.101 (V15.0.0) or an SUL band.

In one embodiment, a position of the X1 PRB(s) in frequency domain being related to whether there exist frequency-domain resources within the first band used for radio signal transmission of the second RAT refers to: a position of the X1 PRB(s) in frequency domain has a mapping relation with whether there exist frequency-domain resources within the first band that can be used for radio signal transmission of the second RAT.

In one embodiment, a position of the X1 PRB(s) in frequency domain being related to whether there exist frequency-domain resources within the first band used for radio signal transmission of the second RAT refers to: a position of the X1 PRB(s) in frequency domain has a conditional relation with whether there exist frequency-domain resources within the first band that can be used for radio signal transmission of the second RAT.

In one embodiment, a position of the X1 PRB(s) in frequency domain being related to whether there exist frequency-domain resources within the first band that can be used for radio signal transmission of the second RAT refers to: whether there exist frequency-domain resources in the first band that can be used for radio signal transmission of the second RAT is used to determine a position of the X1 PRB(s) in frequency domain.

In one embodiment, a position of the X1 PRB(s) in frequency domain refers to a frequency offset between each of the X1 PRB(s) and a grid of a PRB determined by a channel raster; a position of the X1 PRB(s) in frequency domain being related to whether there exist frequency-domain resources within the first band that can be used for radio signal transmission of the second RAT refers to: when there exist frequency-domain resources in the first band that can be used for radio signal transmission employing the second RAT, the frequency offset is equal to 7.5 kHz, otherwise the frequency offset follows an indication of a base station (gNB), or whether the frequency offset is equal to 0 kHz or 7.5 kHz is judged according to at least one of whether the first communication node is in coverage, a synchronization source selected by the first communication node, a serving cell type of the first communication node or a frequency-domain position of the first band.

In one embodiment, a position of the X1 PRB(s) in frequency domain refers to a frequency offset between each of the X1 PRB(s) and a grid of a PRB determined by an NR-ARFCN; a position of the X1 PRB(s) in frequency domain being related to whether there exist frequency-domain resources within the first band that can be used for radio signal transmission of the second RAT refers to: when there exist frequency-domain resources in the first band that can be used for radio signal transmission employing the second RAT, the frequency offset is equal to 7.5 kHz, otherwise the frequency offset follows an indication of a base station (gNB), or whether the frequency offset is equal to 0 kHz or 7.5 kHz is judged according to at least one of whether the first communication node is in coverage, a synchronization source selected by the first communication node, a serving cell type of the first communication node or a frequency-domain position of the first band.

In one embodiment, a position of the X1 PRB(s) in frequency domain refers to a frequency offset between each of the X1 PRB(s) and a grid of a PRB in an SS/PBCH Block determined by a synchronization raster; a position of the X1 PRB(s) in frequency domain being related to whether there exist frequency-domain resources within the first band that can be used for radio signal transmission of the second RAT refers to: when there exist frequency-domain resources in the first band that can be used for radio signal transmission employing the second RAT, the frequency offset is equal to 7.5 kHz, otherwise the frequency offset follows an indication of a base station (gNB), or whether the frequency offset is equal to 0 kHz or 7.5 kHz is judged according to at least one of whether the first communication node is in coverage, a synchronization source selected by the first communication node, a serving cell type of the first communication node or a frequency-domain position of the first band.

Embodiment 16

Figure 16:
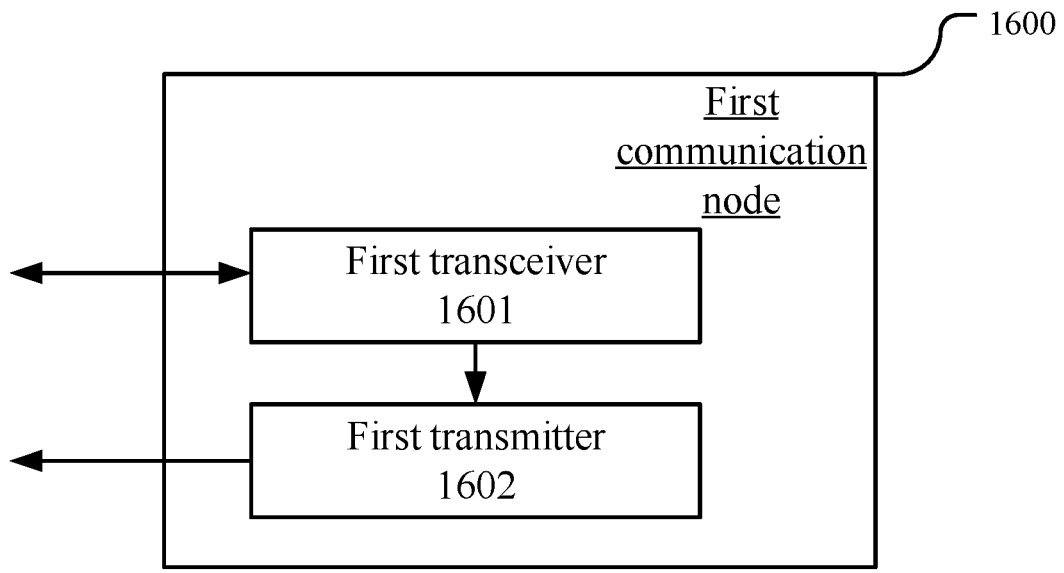
FIG. 16 illustrates a structure block diagram of a processing device in a first communication node according to one embodiment of the present disclosure.

Embodiment 16 illustrates a structure block diagram of a processing device in a first communication node in the present disclosure, as shown in FIG. 16. In FIG. 16, the first communication node's processing device 1600 mainly consists of a first transceiver 1601 and a first transmitter 1602. The first transceiver 1601 comprises the transmitter/receiver 456 (including the antenna 460), the transmitting processor 455, the receiving processor 452 and the controller/processor 490 in FIG. 4 of the present disclosure; the first transmitter 1602 comprises the transmitter 456 (including the antenna 460), the transmitting processor 455 and the controller/processor 490 in FIG. 4 of the present disclosure;

In Embodiment 16, the first transceiver 1601 transmits first information; herein, for a given SCS, the first communication node assumes that X1 PRB(s) is (are) comprised in frequency-domain resources that can be occupied by the first communication node for transmissions, X1 being a positive integer, and the X1 PRB(s) occupies (occupy) consecutive frequency-domain resources; a position of the X1 PRB(s) in frequency domain is related to at least one of whether the first communication node is in coverage or a synchronization reference source selected by the first communication node; the first information is used to indicate a position of the X1 PRB(s) in frequency domain, and the first information is transmitted via an air interface.

In one embodiment, the first transmitter 1602 transmits a first radio signal; herein, for an SCS of a subcarrier occupied by the first radio signal, the first communication node assumes that X2 PRB(s) is (are) comprised in frequency-domain resources that can be occupied by the first communication node for transmissions, X2 being a positive integer; there exists (exist) X3 PRB(s) out of the X2 PRB(s), frequency-domain resources occupied by the first radio signal belong to frequency-domain resources occupied by the X3 PRB(s), any of the X3 PRB(s) is one of the X2 PRB(s), X3 being a positive integer not greater than X2; any of the X1 PRB(s) consists of at least one PRB in the X2 PRB(s), or any of the X2 PRB(s) consists of at least one PRB in the X1 PRB(s).

In one embodiment, for the given SCS, the first communication node assumes that any of the X1 PRB(s) is one of X PRB(s), X being a positive integer not less than X1, and the X PRB(s) occupies (occupy) consecutive frequency-domain resources; a first reference frequency is a frequency within frequency-domain resources comprised in the X PRB(s), for the given SCS and X, a relative position of the first reference frequency in frequency-domain resources comprised in the X PRB(s) is fixed; the first information is used to indicate an absolute position of the first reference frequency in frequency domain.

In one embodiment, for the given SCS, the first communication node assumes that any of the X1 PRB(s) is one of X PRB(s), X being a positive integer not less than X1, and the X PRB(s) occupies (occupy) consecutive frequency-domain resources; a first reference frequency is a frequency within frequency-domain resources comprised in the X PRB(s), for the given SCS and X, a relative position of the first reference frequency in frequency-domain resources comprised in the X PRB(s) is fixed; the first information is used to indicate an absolute position of the first reference frequency in frequency domain; the X PRB(s) is (are) indexed from 0 to X−1 according to frequency in an ascending order; when X is an even number, a PRB with an index value equal to Y1 in the X PRB(s) is a first PRB, Y1 is equal to half of X, the first reference frequency is equal to a characteristic frequency of a subcarrier with a lowest frequency belonging to the first PRB; when X is an odd number, a PRB with an index value equal to Y2 in the X PRB(s) is a second PRB, the first reference frequency is equal to a characteristic frequency of a 7-th subcarrier arranged according to frequency in an ascending order belonging to the second PRB, Y2 is equal to half of a difference of X minus 1.

In one embodiment, when the first communication node is in coverage, a position(s) of the X1 PRB in frequency domain is related to a type of a serving cell of the first communication node.

In one embodiment, a position of the X1 PRB(s) in frequency domain is related to a position of a band to which the X1 PRB(s) belongs (belong) in frequency domain.

In one embodiment, the first transceiver 1601 also receives second information; herein, the second information is used to determine a first frequency offset, the first frequency offset is equal to 0 kHz or 7.5 kHz, and the first information is used to indicate the first frequency offset; for the given SCS, the first frequency offset is equal to a frequency offset between a subcarrier comprised in the X1 PRB(s) and a subcarrier grid determined by a frequency on a channel raster, or the first frequency offset is equal to a frequency offset between a subcarrier comprised in the X1 PRB(s) and a subcarrier grid determined by a frequency on a synchronization raster.

In one embodiment, the first transceiver 1601 also transmits third information; herein, the third information is used to indicate a second frequency offset, and the second frequency offset is equal to 0 kHz or 7.5 kHz; the second frequency offset is a frequency offset between a subcarrier assumed by the first communication node for receptions and a subcarrier grid determined by a frequency on a channel raster, or the second frequency offset is a frequency offset between a subcarrier assumed by the first communication node for receptions and a subcarrier grid determined by a frequency on a synchronization raster.

In one embodiment, a carrier to which the X1 PRB(s) belongs (belong) in frequency domain is a first carrier, a band to which the first carrier belongs is a first band, a RAT employed in transmission in the first carrier is a first RAT, a position of the X1 PRB(s) in frequency domain is related to whether there exist frequency-domain resources in the first band that can be used for radio signal transmission employing a second RAT, and the second RAT is a RAT other than the first RAT.

Embodiment 17

Figure 17:
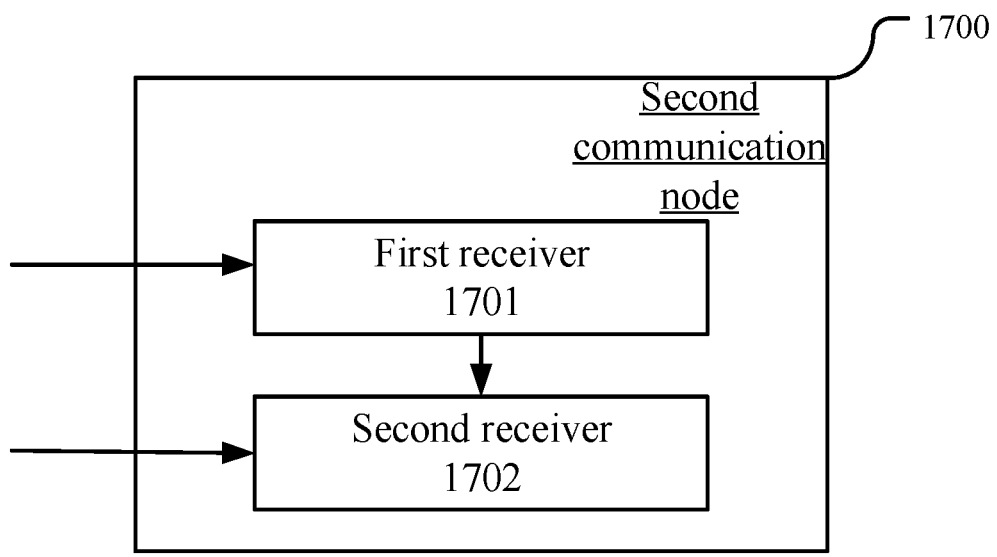
FIG. 17 illustrates a structure block diagram of a processing device in a second communication node according to one embodiment of the present disclosure.

Embodiment 17 illustrates a structure block diagram of a processing device of a second communication node according to one embodiment, as shown in FIG. 17. In FIG. 17, a second communication node's processing device 1700 mainly consists of a first receiver 1701 and a second receiver 1702. The first receiver 1701 comprises the transmitter/receiver 416 (including the antenna 420), the receiving processor 412 and the controller/processor 440 in FIG. 4 of the present disclosure; the second receiver 1702 comprises the transmitter/receiver 416 (including the antenna 420), the receiving processor 412 and the controller/processor 440 in FIG. 4 of the present disclosure.

In Embodiment 17, the first receiver 1701 receives first information; herein, for a given SCS, the second communication node assumes that X1 PRB(s) is (are) comprised in frequency-domain resources that can be occupied by a transmitter of the first information for transmissions, X1 being a positive integer, and the X1 PRB(s) occupies (occupy) consecutive frequency-domain resources; a position of the X1 PRB(s) in frequency domain is related to at least one of whether the transmitter of the first information is in coverage or a synchronization reference source selected by the transmitter of the first information; the first information is used to indicate a position of the X1 PRB(s) in frequency domain, and the first information is transmitted via an air interface.

In one embodiment, the second receiver 1702 also receives a first radio signal; herein, for an SCS of a subcarrier occupied by the first radio signal, the second communication node assumes that X2 PRB(s) is (are) comprised in frequency-domain resources that can be occupied by a transmitter of the first radio signal for transmissions, X2 being a positive integer; there exists (exist) X3 PRB(s) out of the X2 PRB(s), frequency-domain resources occupied by the first radio signal belong to frequency-domain resources occupied by the X3 PRB(s), any of the X3 PRB(s) is one of the X2 PRB(s), X3 being a positive integer not greater than X2; any of the X1 PRB(s) consists of at least one PRB in the X2 PRB(s), or any of the X2 PRB(s) consists of at least one PRB in the X1 PRB(s).

In one embodiment, for the given SCS, the second communication node assumes that any of the X1 PRB(s) is one of X PRB(s), X being a positive integer not less than X1, and the X PRB(s) occupies (occupy) consecutive frequency-domain resources; a first reference frequency is a frequency within frequency-domain resources comprised in the X PRB(s), for the given SCS and X, a relative position of the first reference frequency in frequency-domain resources comprised in the X PRB(s) is fixed; the first information is used to indicate an absolute position of the first reference frequency in frequency domain.

In one embodiment, for the given SCS, the second communication node assumes that any of the X1 PRB(s) is one of X PRB(s), X being a positive integer not less than X1, and the X PRB(s) occupies (occupy) consecutive frequency-domain resources; a first reference frequency is a frequency within frequency-domain resources comprised in the X PRB(s), for the given SCS and X, a relative position of the first reference frequency in frequency-domain resources comprised in the X PRB(s) is fixed; the first information is used to indicate an absolute position of the first reference frequency in frequency domain; the X PRB(s) is (are) indexed from 0 to X−1 according to frequency in an ascending order; when X is an even number, a PRB with an index value equal to Y1 in the X PRB(s) is a first PRB, Y1 is equal to half of X, the first reference frequency is equal to a characteristic frequency of a subcarrier with a lowest frequency belonging to the first PRB; when X is an odd number, a PRB with an index value equal to Y2 in the X PRB(s) is a second PRB, the first reference frequency is equal to a characteristic frequency of a 7-th subcarrier arranged according to frequency in an ascending order belonging to the second PRB, Y2 is equal to half of a difference of X minus 1.

In one embodiment, when the transmitter of the first information is in coverage, a position of the X1 PRB(s) in frequency domain is related to a type of a serving cell of the transmitter of the first information.

In one embodiment, a position of the X1 PRB(s) in frequency domain is related to a position of a band to which the X1 PRB(s) belongs (belong) in frequency domain.

In one embodiment, the first receiver 1701 also receives third information; herein, the third information is used to indicate a second frequency offset, and the second frequency offset is equal to 0 kHz or 7.5 kHz; the second frequency offset is a frequency offset between a subcarrier assumed by a transmitter of the third information for receptions and a subcarrier grid determined by a frequency on a channel raster, or the second frequency offset is a frequency offset between a subcarrier assumed by a transmitter of the third information for receptions and a subcarrier grid determined by a frequency on a synchronization raster.

In one embodiment, a carrier to which the X1 PRB(s) belongs (belong) in frequency domain is a first carrier, a band to which the first carrier belongs is a first band, a RAT employed in transmission in the first carrier is a first RAT, a position of the X1 PRB(s) in frequency domain is related to whether there exist frequency-domain resources in the first band that can be used for radio signal transmission employing a second RAT, and the second RAT is a RAT other than the first RAT.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first communication node, the second communication node, or the UE, or the terminal in the present disclosure includes but is not limited to mobile phones, tablet computers, notebooks, network cards, low-consumption equipment, enhanced MTC (eMTC) terminals, NB-IoT terminals, vehicle-mounted communication equipment, Road Side Unit (RSU), aircrafts, diminutive airplanes, unmanned aerial vehicles, telecontrolled aircrafts and other wireless communication devices. The first communication node in the present disclosure includes but is not limited to base station or network side device, and includes but is not limited to the macro-cellular base stations, micro-cellular base stations, home base stations, relay base stations, eNB, gNB, Transmitting and Receiving Point (TRP) and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first communication node for wireless communications, comprising:
   transmitting first information;
   wherein for a given Subcarrier Spacing (SCS), the first communication node assumes that X1 Physical Resource Block(s) (PRB(s)) is (are) comprised in frequency-domain resources that can be occupied by the first communication node for transmissions, X1 being a positive integer, and the X1 PRB(s) occupies (occupy) consecutive frequency-domain resources; a position of the X1 PRB(s) in frequency domain is related to whether the first communication node is in coverage; the first information is used to indicate a position of the X1 PRB(s) in frequency domain, and the first information is transmitted via an air interface; whether the first communication node is in coverage refers to whether the first communication node can find a cell meeting S criterion.

2. The method according to claim 1, also comprising:
transmitting a first radio signal;
wherein for an SCS of a subcarrier occupied by the first radio signal, the first communication node assumes that X2 PRB(s) is (are) comprised in frequency-domain resources that can be occupied by the first communication node for transmissions, X2 being a positive integer; there exists (exist) X3 PRB(s) out of the X2 PRB(s), frequency-domain resources occupied by the first radio signal belong to frequency-domain resources occupied by the X3 PRB(s), any of the X3 PRB(s) is one of the X2 PRB(s), X3 being a positive integer not greater than X2; any of the X1 PRB(s) consists of at least one PRB in the X2 PRB(s), or any of the X2 PRB(s) consists of at least one PRB in the X1 PRB(s).

3. The method according to claim 1, wherein for the given SCS, the first communication node assumes that any of the X1 PRB(s) is one of X PRB(s), X being a positive integer not less than X1, and the X PRB(s) occupies (occupy) consecutive frequency-domain resources; a first reference frequency is a frequency within frequency-domain resources comprised in the X PRB(s), for the given SCS and X, a relative position of the first reference frequency in frequency-domain resources comprised in the X PRB(s) is fixed; the first information is used to indicate an absolute position of the first reference frequency in frequency domain.

4. The method according to claim 3, wherein the X PRB(s) is (are) indexed from 0 to X−1 according to frequency in an ascending order; when X is an even number, a PRB with an index value equal to Y1 in the X PRB(s) is a first PRB, Y1 is equal to half of X, the first reference frequency is equal to a characteristic frequency of a subcarrier with a lowest frequency belonging to the first PRB; when X is an odd number, a PRB with an index value equal to Y2 in the X PRB(s) is a second PRB, the first reference frequency is equal to a characteristic frequency of a 7-th subcarrier arranged according to frequency in an ascending order belonging to the second PRB, Y2 is equal to half of a difference of X minus 1.

5. The method according to claim 1, wherein when the first communication node is in coverage, a position of the X1 PRB(s) in frequency domain is related to a type of a serving cell of the first communication node.

6. The method according to claim 1, wherein a position of the X1 PRB(s) in frequency domain is related to a position of a band to which the X1 PRB(s) belongs (belong) in frequency domain.

7. The method according to claim 1, also comprising:
receiving second information;
wherein the second information is used to determine a first frequency offset, the first frequency offset is equal to 0 kHz or 7.5 kHz, and the first information is used to indicate the first frequency offset; for the given SCS, the first frequency offset is equal to a frequency offset between a subcarrier comprised in the X1 PRB(s) and a subcarrier grid determined by a frequency on a channel raster, or the first frequency offset is equal to a frequency offset between a subcarrier comprised in the X1 PRB(s) and a subcarrier grid determined by a frequency on a synchronization raster.

8. The method according to claim 1, wherein the first information being used to indicate a position of the X1 PRB(s) in frequency domain includes: the first information is used to indicate at least one of whether the first communication node is in coverage; the first information is transmitted through a Physical Sidelink Broadcast Channel (PSBCH), and the first information carries a Master Information Block Sidelink.

9. The method according to claim 1, wherein the first information is transmitted in a first time window, and a receiver of the first information can assume that the first information is valid in the first time window; a time length of the first time window is fixed, or a time length of the first time window is configurable.

10. A first communication node for wireless communications, comprising:
a first transceiver, which transmits first information;
wherein for a given SCS, the first communication node assumes that X1 PRB(s) is (are) comprised in frequency-domain resources that can be occupied by the first communication node for transmissions, X1 being a positive integer, and the X1 PRB(s) occupies (occupy) consecutive frequency-domain resources; a position of the X1 PRB(s) in frequency domain is related to whether the first communication node is in coverage; the first information is used to indicate a position of the X1 PRB(s) in frequency domain, and the first information is transmitted via an air interface; whether the first communication node is in coverage refers to whether the first communication node can find a cell meeting S criterion.

11. The first communication node according to claim 10, comprising:
a first transmitter, which transmits a first radio signal;
wherein for an SCS of a subcarrier occupied by the first radio signal, the first communication node assumes that X2 PRB(s) is (are) comprised in frequency-domain resources that can be occupied by the first communication node for transmissions, X2 being a positive integer; there exists (exist) X3 PRB(s) out of the X2 PRB(s), frequency-domain resources occupied by the first radio signal belong to frequency-domain resources occupied by the X3 PRB(s), any of the X3 PRB(s) is one of the X2 PRB(s), X3 being a positive integer not greater than X2; any of the X1 PRB(s) consists of at least one PRB in the X2 PRB(s), or any of the X2 PRB(s) consists of at least one PRB in the X1 PRB(s).

12. The first communication node according to claim 10, wherein for the given SCS, the first communication node assumes that any of the X1 PRB(s) is one of X PRB(s), X being a positive integer not less than X1, and the X PRB(s) occupies (occupy) consecutive frequency-domain resources; a first reference frequency is a frequency within frequency-domain resources comprised in the X PRB(s), for the given SCS and X, a relative position of the first reference frequency in frequency-domain resources comprised in the X PRB(s) is fixed; the first information is used to indicate an absolute position of the first reference frequency in frequency domain.

13. The first communication node according to claim 12, wherein the X PRB(s) is (are) indexed from 0 to X−1 according to frequency in an ascending order; when X is an even number, a PRB with an index value equal to Y1 in the X PRB(s) is a first PRB, Y1 is equal to half of X, the first reference frequency is equal to a characteristic frequency of a subcarrier with a lowest frequency belonging to the first PRB; when X is an odd number, a PRB with an index value equal to Y2 in the X PRB(s) is a second PRB, the first reference frequency is equal to a characteristic frequency of a 7-th subcarrier arranged according to frequency in an ascending order belonging to the second PRB, Y2 is equal to half of a difference of X minus 1.

14. The first communication node according to claim 10, wherein when the first communication node is in coverage, a position of the X1 PRB(s) in frequency domain is related to a type of a serving cell of the first communication node.

15. The first communication node according to claim 10, wherein a position of the X1 PRB(s) in frequency domain is related to a position of a band to which the X1 PRB(s) belongs (belong) in frequency domain.

16. The first communication node according to claim 10, wherein the first transceiver receives second information; wherein the second information is used to determine a first frequency offset, the first frequency offset is equal to 0 kHz or 7.5 kHz, and the first information is used to indicate the first frequency offset; for the given SCS, the first frequency offset is equal to a frequency offset between a subcarrier comprised in the X1 PRB(s) and a subcarrier grid determined by a frequency on a channel raster, or the first frequency offset is equal to a frequency offset between a subcarrier comprised in the X1 PRB(s) and a subcarrier grid determined by a frequency on a synchronization raster.

17. The first communication node according to claim 10, wherein the first information being used to indicate a position of the X1 PRB(s) in frequency domain includes: the first information is used to indicate at least one of whether the first communication node is in coverage; the first information is transmitted through a PSBCH, and the first information carries a Master Information Block Sidelink.

18. The first communication node according to claim 10, wherein the first information is transmitted in a first time window, and a receiver of the first information can assume that the first information is valid in the first time window; a time length of the first time window is fixed, or a time length of the first time window is configurable.

* * * * *